(12) United States Patent
Di Profio

(10) Patent No.: US 7,882,047 B2
(45) Date of Patent: Feb. 1, 2011

(54) PARTIALLY OBSERVABLE MARKOV DECISION PROCESS INCLUDING COMBINED BAYESIAN NETWORKS INTO A SYNTHESIZED BAYESIAN NETWORK FOR INFORMATION PROCESSING

(75) Inventor: Ugo Di Profio, Kanagawa (JP)

(73) Assignee: Sony Corporation, Tokyo (JP)

( * ) Notice: Subject to any disclaimer, the term of this patent is extended or adjusted under 35 U.S.C. 154(b) by 832 days.

(21) Appl. No.: 11/759,083

(22) Filed: Jun. 6, 2007

(65) Prior Publication Data

US 2008/0133436 A1 Jun. 5, 2008

(30) Foreign Application Priority Data

Jun. 7, 2006 (JP) ............................. 2006-158566

(51) Int. Cl.
G06F 15/18 (2006.01)
(52) U.S. Cl. ...................................... 706/12
(58) Field of Classification Search .................... 706/12
See application file for complete search history.

(56) References Cited

U.S. PATENT DOCUMENTS

| 6,651,044 B1 | 11/2003 | Stoneman |
| 2002/0103793 A1 | 8/2002 | Koller et al. |
| 2004/0220892 A1 | 11/2004 | Cohen et al. |

FOREIGN PATENT DOCUMENTS

JP 2005-107747 4/2005

OTHER PUBLICATIONS

Boutilier, Craig and David Poole "Computing Optimal Policies for Partially OBservable Decision Processes using Compact Representations" Proceedings of the 13th National Conference on Artificial intelligence 1996. Downloaded Apr. 15, 2010.*
Husmeier, Dirk "Sensitivity and specificity of inferring genetic regulatory interactions from microarray experiments with dynamic Bayesian Networks" vol. 19, No. 17 2003, pp. 2271-2282. Downloaded Apr. 15, 2010.*
Williams, Jason, Pascal Poupart, and Steve Young "Factored Partially Observable Markov Decision Processes for Dialogue Management" Aug. 1, 2005. Downloaded Apr. 15, 2010.*
Theocharous, G. et al., "Representing hierarchical POMDPs as DBNs for multi-scale robot localization", Proceedings of the 2004 IEEE, International Conference on Robotics & Automation, New Orleans, LA, Apr. 2004, pp. 1045-1051.

* cited by examiner

Primary Examiner—Donald Sparks
Assistant Examiner—Ben M Rifkin
(74) Attorney, Agent, or Firm—Finnegan, Henderson, Farabow, Garrett & Dunner, L.L.P.

(57) ABSTRACT

Disclosed herein is an information-processing apparatus for constructing an information analysis processing configuration to be applied to information analysis processing in an observation domain including an uncertainty. The information-processing apparatus includes a data processing unit for: taking a Partially Observable Markov Decision Process as a basic configuration; taking each of elements included in every information space defined in the Partially Observable Markov Decision Process as a unit; analyzing relations between the elements; and constructing a Factored Partially Observable Markov Decision Process, which is a Partially Observable Markov Decision Process including the relations between the elements, on the basis of results of the analysis.

12 Claims, 15 Drawing Sheets

F I G. 4
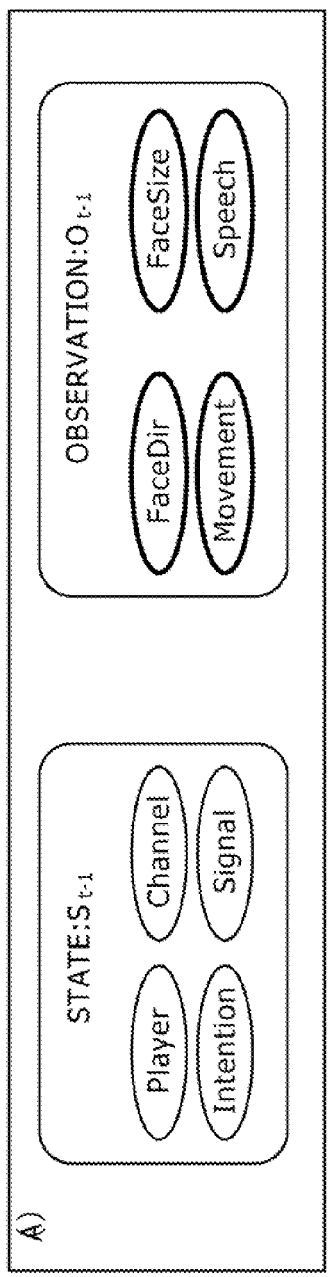
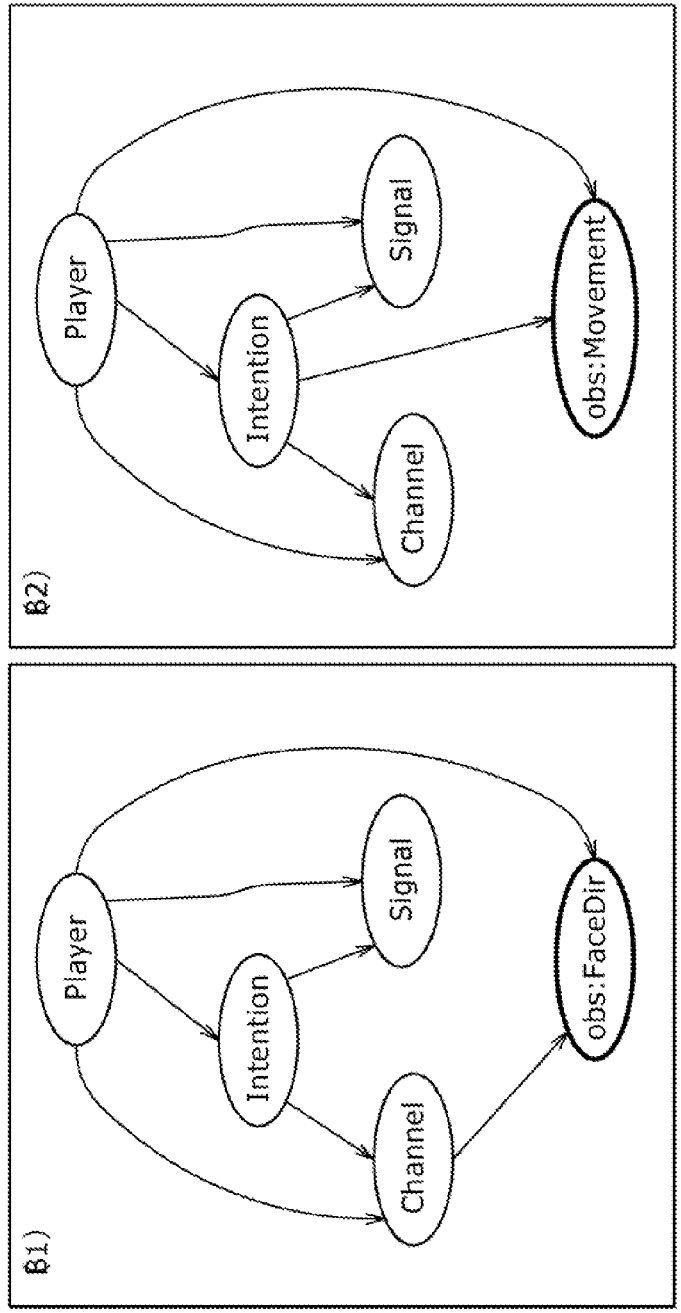

FIG. 5
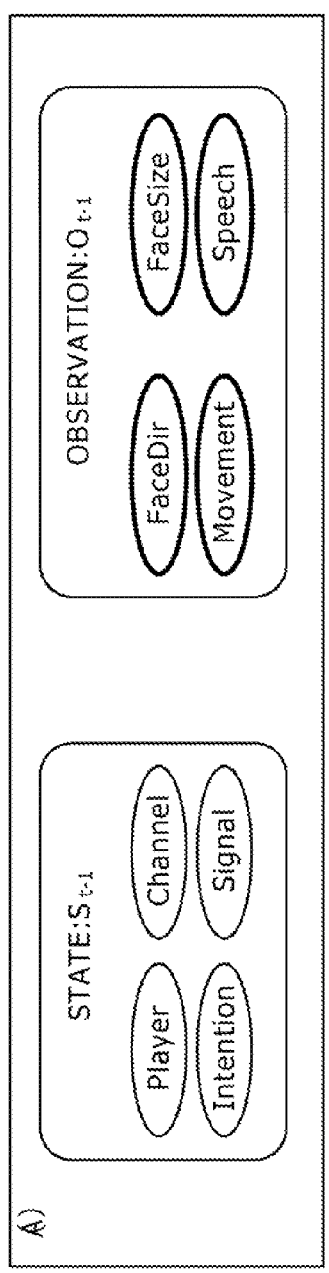
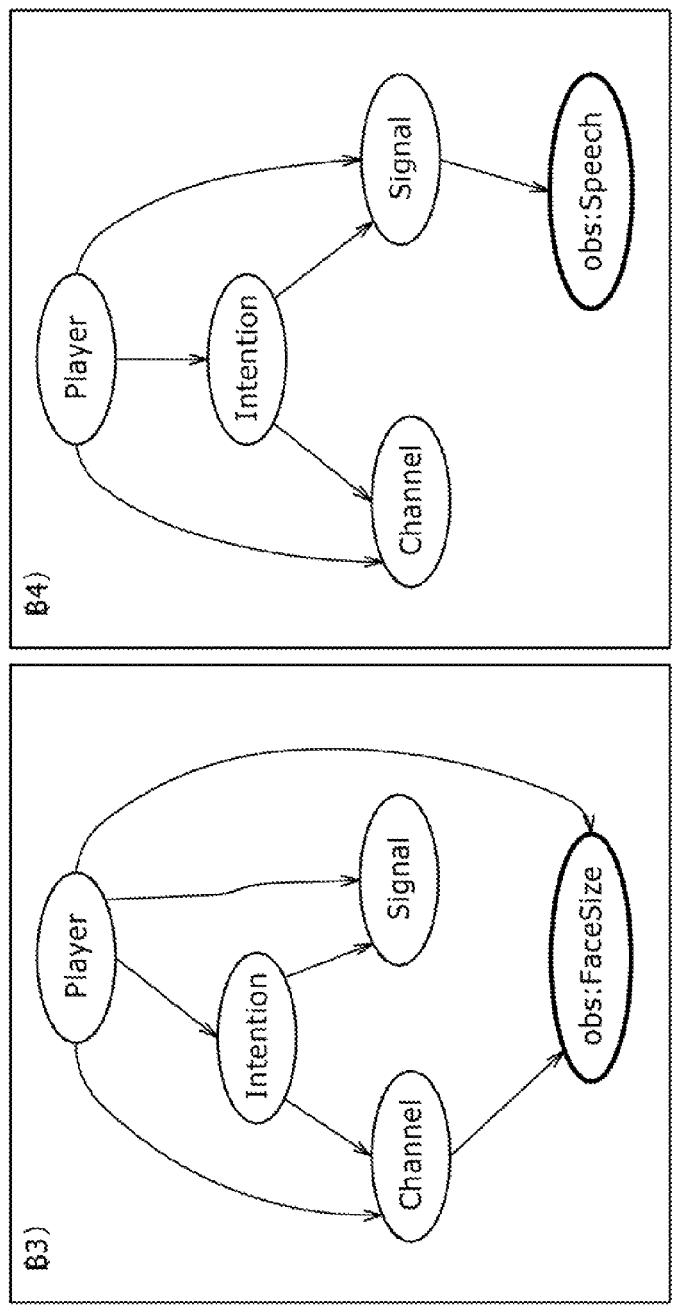

FIG. 6
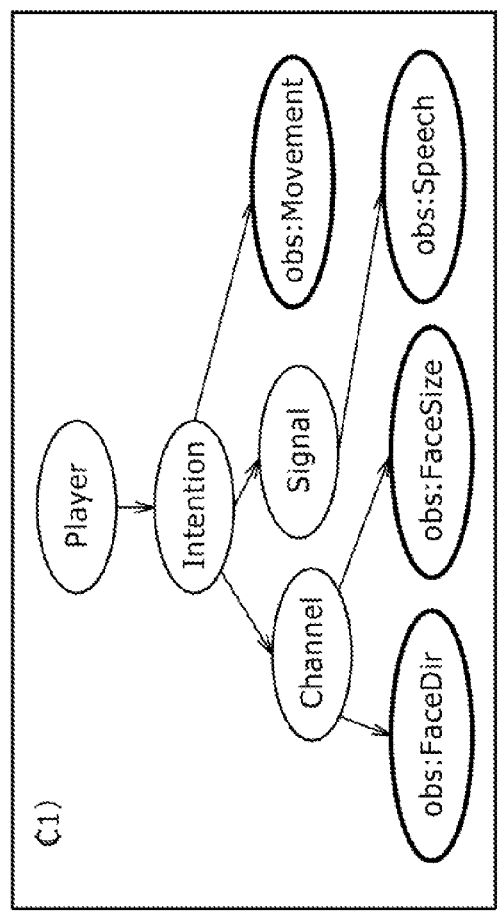
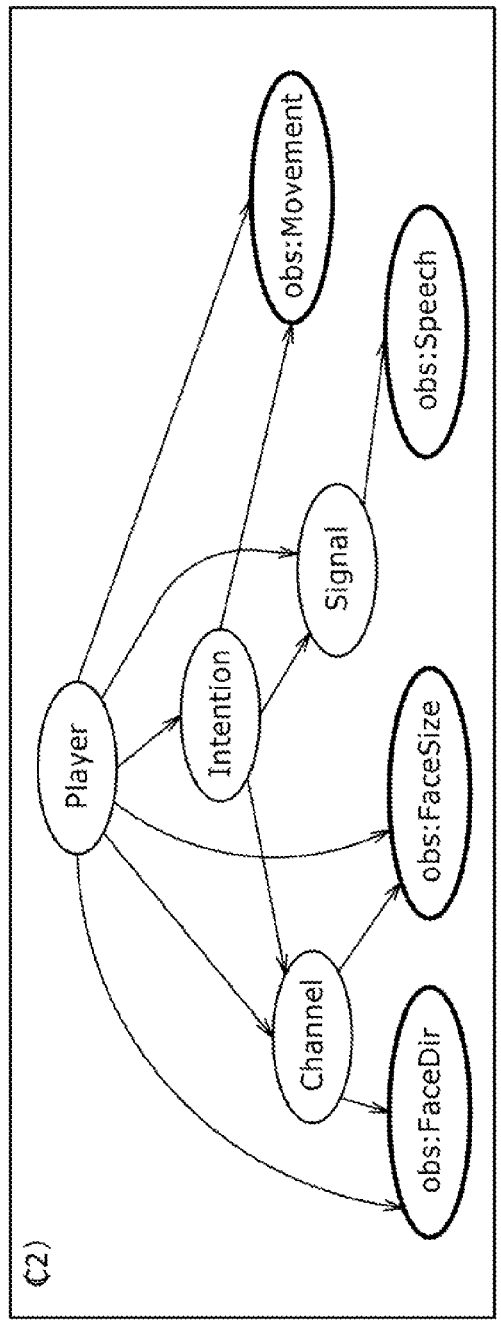

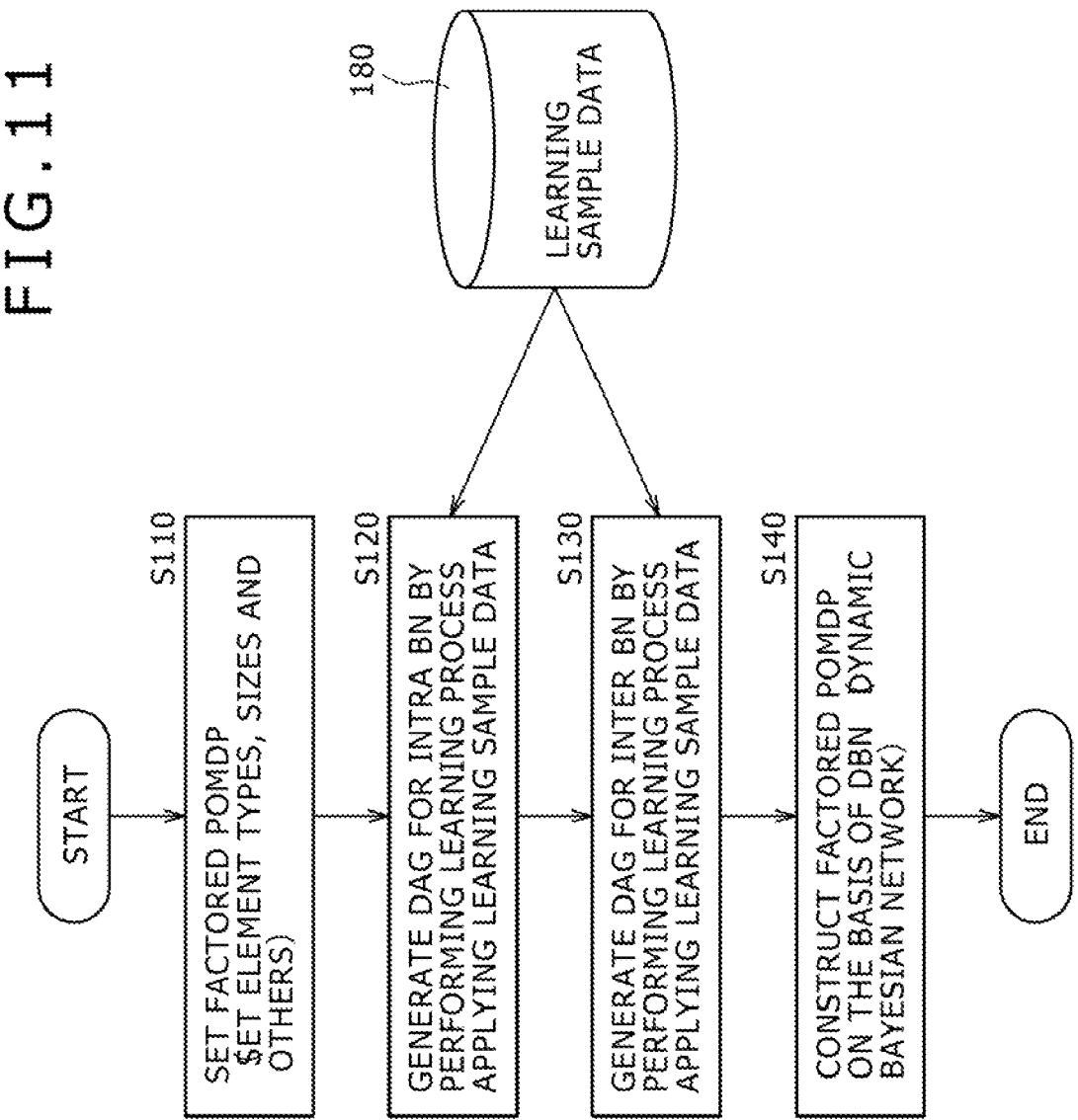

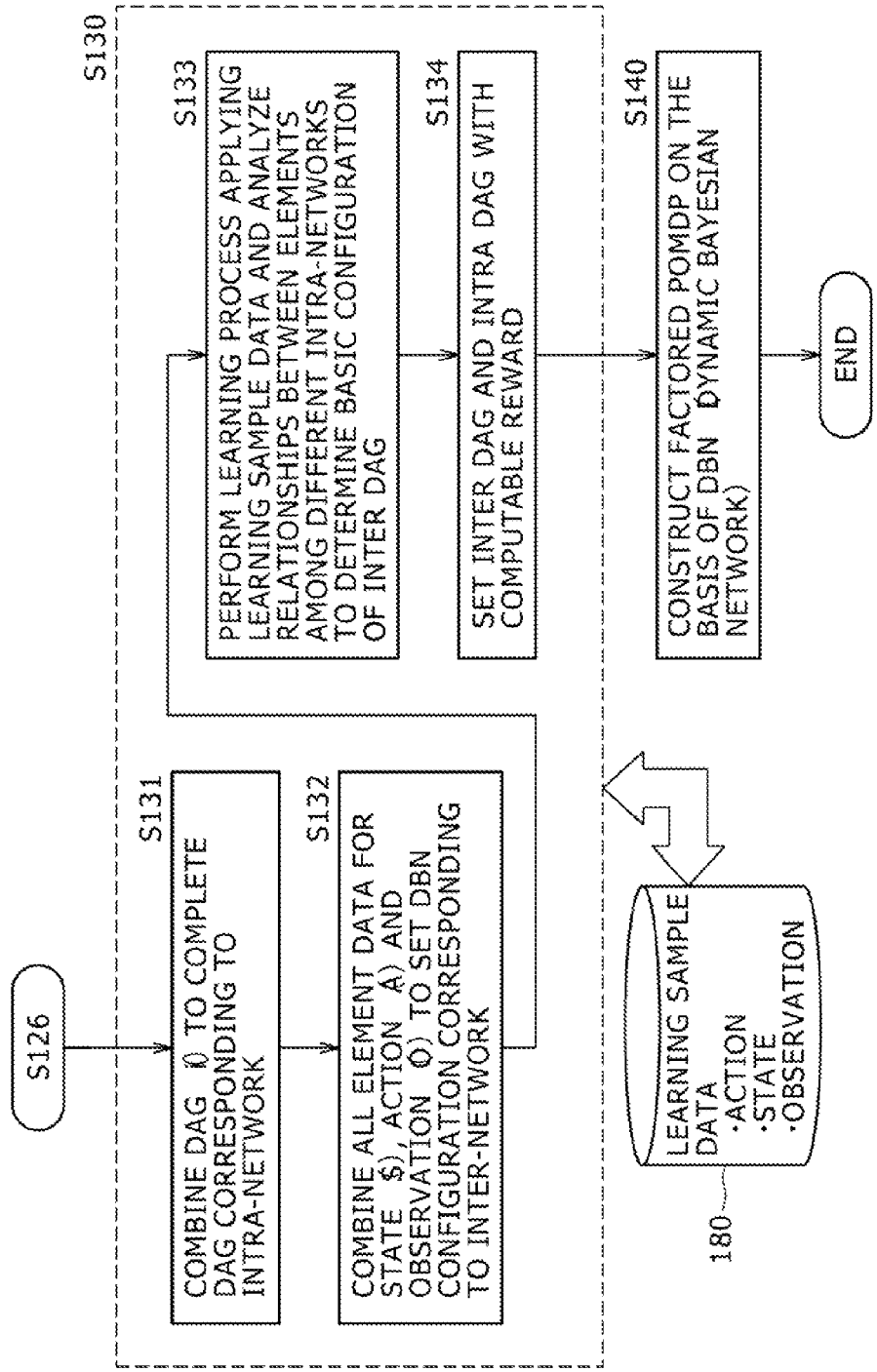

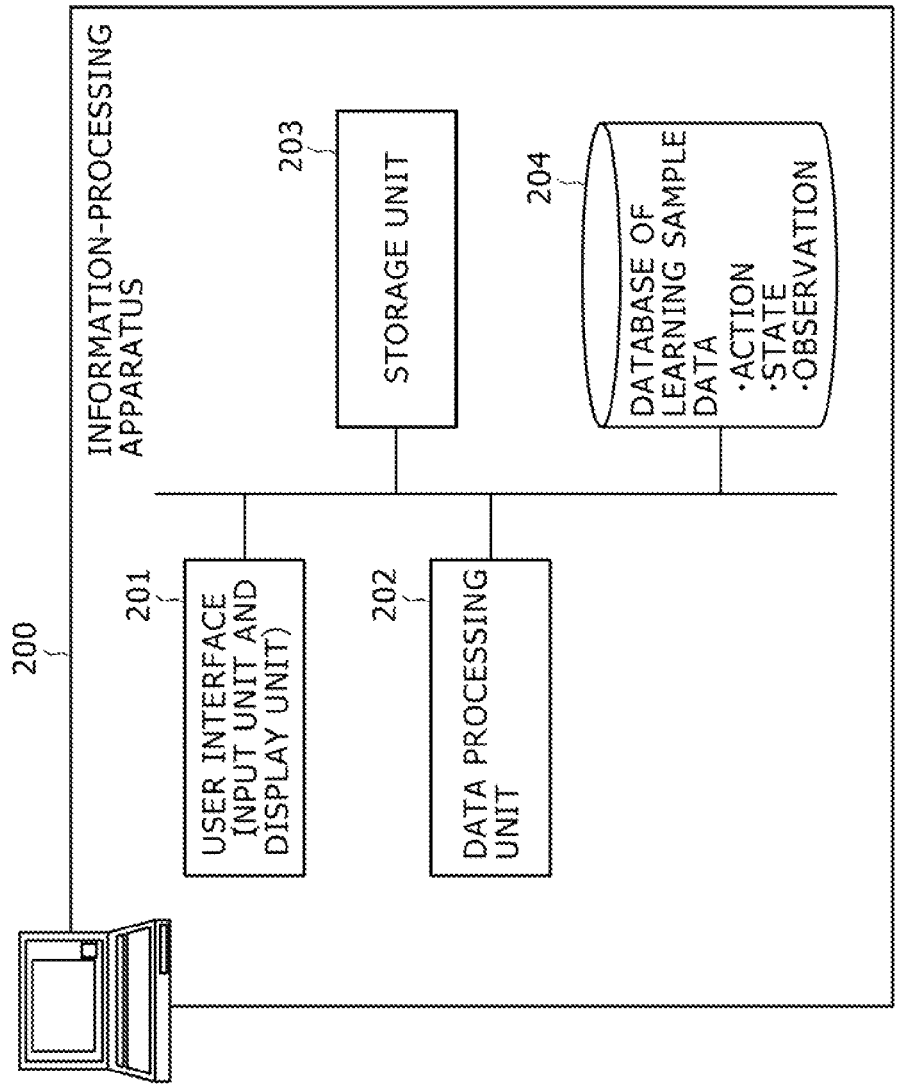

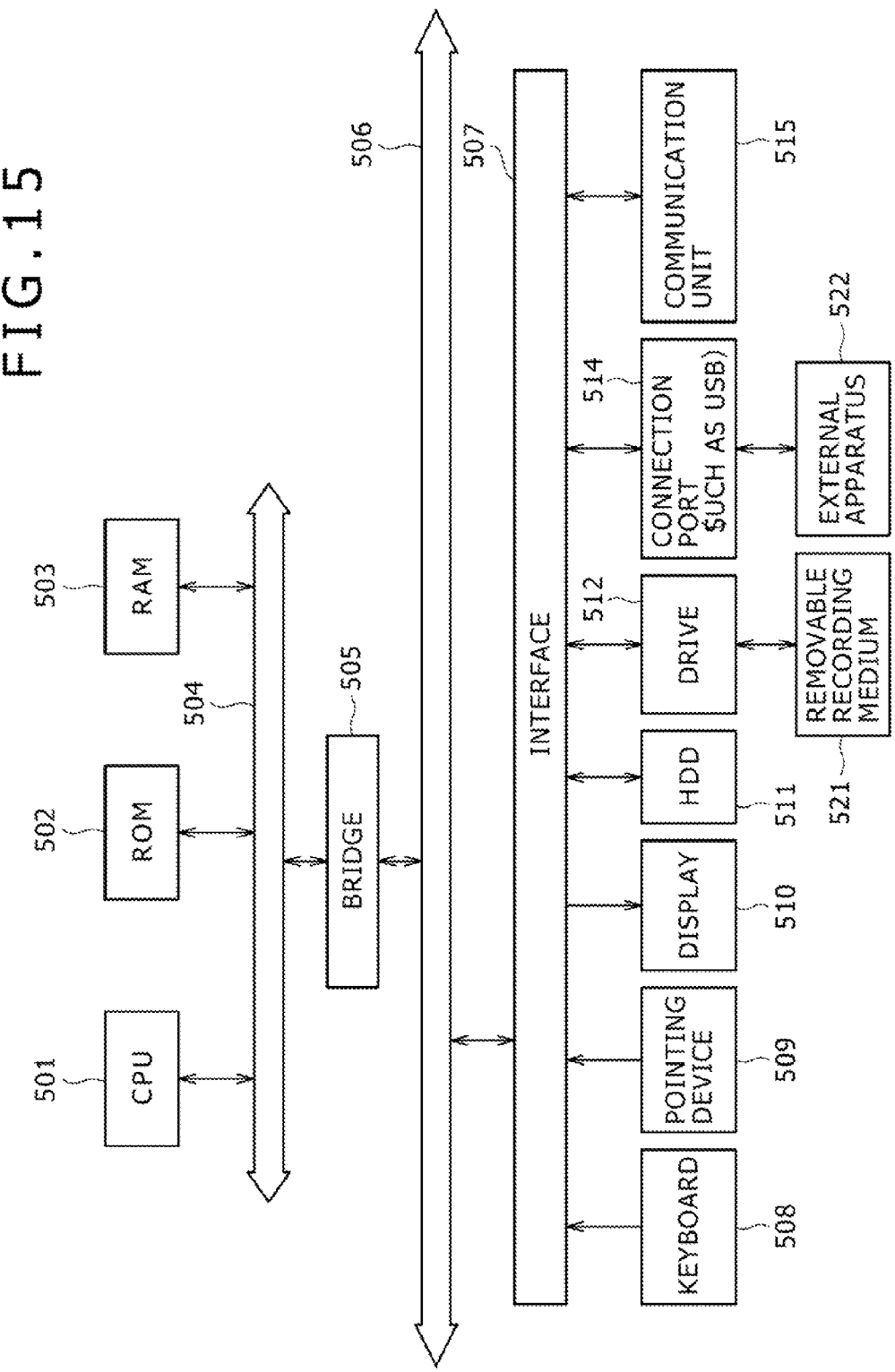

PARTIALLY OBSERVABLE MARKOV DECISION PROCESS INCLUDING COMBINED BAYESIAN NETWORKS INTO A SYNTHESIZED BAYESIAN NETWORK FOR INFORMATION PROCESSING

CROSS REFERENCES TO RELATED APPLICATIONS

The present invention contains subject matter related to Japanese Patent Application JP 2006-158566, filed in the Japan Patent Office on Jun. 1, 2006, the entire contents of which being incorporated herein by reference.

BACKGROUND OF THE INVENTION

1. Field of the Invention

The present invention relates to an information-processing apparatus, an information processing method adopted by the information-processing apparatus and a computer program implementing the information processing method. To put it in detail, the present invention relates to an information-processing apparatus for automatically constructing an FPOMDP (Factored Partially Observable Markov Decision Process) by taking a POMDP (Partially Observable Markov Decision Process) as a basic configuration, relates to an information processing method adopted by the information-processing apparatus and relates to a computer program implementing the information processing method.

2. Description of the Related Art

As one of state-prediction/action-determination methods, a technique of processing applying a POMDP is known. An outline of the POMDP is explained as follows.

The POMDP is carried out as a process applying the following pieces of information:

(a): State space: S
(b): Action space: A
(c): State-transition probability computation function for computing a probability P of a transition from a state S existing at a time T=(t−1) to a state S existing at a next time T=t: T $(s_t, a_{t-1}, s_{t-1})$=P $(s_t|a_{t-1}, s_{t-1})$.

In this case, symbol st denotes the state S existing at the time T=t, symbol $s_{t-1}$ denotes the state S existing at the time T=(t−1) and symbol $a_{t-1}$ denotes an action A taken at the time T=(t−1). It is thus obvious that the probability P is computed from $s_{t-1}$ representing the state S existing at, the time T=(t−1) and $a_{t-1}$ representing the action A taken at the time T=(t−1).

(d): Reward function for computing a reward from $s_t$ representing the state S existing at the time T=t and at representing the action A taken at the time T=t: R $(s_t, a_t)$.
(e): Observation space: Ω
(f): Observation-generation probability computation function for computing a probability P of generation of an observation state at the time T=t: O $(s_t, a_{t-1}, o_{t-1})$=P $(o_t|a_{t-1}, s_t)$.

In this case, symbol $o_t$ denotes an observation generated, at the time T=t. It is thus obvious that the probability P is computed from $s_t$ representing the state S existing at the time T=t and $a_{t-1}$ representing the action A taken at the time T=(t−1).

The POMDP is a process for predicting a state and determining an action by application of the pieces of described above. For example, the POMDP is applicable to processing to determine an action considered to be optimum from little information that can be acquired. To put it concretely, the POMDP can be applied to various kinds of action determination processing such as processing to determine an action to be taken by a robot, a simulation making use of a computer, data processing and processing to determine an optimum action in business management.

By referring to FIG. 1, the following description explains processing based on the POMDP as processing fox predicting a state and determining an action by application of the pieces of information described above. FIG. 1 is a diagram, showing $s_{t-1}$ representing a state S existing at the time T=(t−1), $a_{t-1}$ representing an action A taken at the time T=(t−1), $R_{t-1}$ representing a reward R given at the time T=(t−1) and $o_{t-1}$ representing an observation generated at the time T=(t−1) as well as $s_t$ representing a state S existing at the time T=t, at representing an action A taken at the time T=t, $R_t$ representing a reward R given at the time T=t and $o_t$ representing an observation generated at the time T=t following the time T=(t−1). Every arrow originating from a block serving as a parent and pointing to a block serving as a child indicates that the information and state of the parent have an effect on the information and state of the child.

For example, $R_{t-1}$ representing a reward R given at the time T=(t−1) is found as the value of the reward function R $(s_{t-1}, a_{t-1})$ from $s_{t-1}$ representing the state S existing at the time T=(t−1) and $a_{t-1}$ representing the action A taken at the time T=(t−1).

$o_{t-1}$ representing an observation generated at the time T=(t−1) is typically observable information varying with a change in $s_{t-1}$ representing the state S existing at the time T=(t−1).

Each of rewards given at other times such as t, (t+1) and so on is found by making use of the same relation as the reward given at the time T=(t−1). By the same token, each of observations generated at the other times is found by making use of the same relation as the observation generated at the time T=(t−1).

The state-transition probability computation function T $(s_t, a_{t-1}, s_{t-1})$=P $(s_t|a_{t-1}, s_{t-1})$ given above is a relation between quantities of different times. To be more specific, the state-transition probability computation function T $(s_t, a_{t-1}, s_{t-1})$=P $(s_t|a_{t-1}, s_{t-1})$ given above is a relation between $s_t$ representing the state S existing at the time T=t and $s_{t-1}$ representing the state S existing at the time T=(t−1) as well as $a_{t-1}$ representing the action A taken at the time T=(t−1). That is to say, the probability that the observation $s_{t-1}$ exists at the time T=t is found from $s_{t-1}$ representing the state S existing at the time T=(t−1) and $a_{t-1}$ representing the action A taken at the time T=(t−1). This relation holds true as a relation between quantities of any consecutive event observation times.

As described above, in the POMDP, in an observation domain including uncertainty, a variety of information spaces such as the state space, the action space, the reward space and the observation space are defined. Then, on the basis of the relationships between these information spaces, a state transition in the observation domain including uncertainty is predicted and an action of its own in the observation domain is determined. As typical processing to determine an action, for example, a best action with a highest computed reward is determined.

It is to be noted that a process to correctly set the relationships between the information spaces such as the state space, the action space, the reward space and the observation space is of importance to process construction processing based on the POMDP. In the process to correctly set the relationships between the information spaces, a BN (Bayesian Network) is used. The BN is a network including a plurality of nodes, relationships between which are defined. Processing to generate a and processing to make use of a BN are described in documents such as US Patent No. 2004/0220892 and US Patent No. 2002/0103793, which explain processing to generate a highly reliable BN correctly defining relationships between nodes included therein.

In the POMDP explained above by referring to FIG. 1, the information spaces applied to the processing to determine an action as information spaces for each time are each processed as information space including only one element. In this case, the information spaces for each time are the state space, the reward space and the observation space, In the actual environment, on the other hand, a state space obtainable as information and/or an observation space obtainable as information each include a variety of elements (or factors) different from each other in many cases. In case of the traditional POMDP, a configuration for automatically constructing a POMDP taking these elements (or factors) different from each other into consideration is not implemented.

SUMMARY OF THE INVENTION

Addressing the problems described above, inventors of the present invention have innovated an information-processing apparatus for automatically constructing an FPOMDP (Factored Partially Observable Markov Decision Process) making it possible to carry out a process taking a variety of elements (or factors) different from each other into consideration in processing applying the POMDP to predict a state transition and/or determine an action, innovated an information processing method adopted by the information-processing apparatus and innovated a computer program implementing the information processing method.

In accordance with a first embodiment of the present invention, there is provided an information-processing apparatus for constructing an information analysis processing configuration to be applied to information analysis processing in an observation domain including an uncertainty. The information-processing apparatus is characterized in that the information-processing apparatus employs a data processing unit for:

taking a POMDP (Partially Observable Markov Decision Process) as a basic configuration;

taking each of elements included in every information space defined in the POMDP as a unit;

analyzing relations between the elements; and constructing an FPOMDP (Factored Partially Observable Markov Decision Process), which is a POMDP including the relations between the elements, on the basis of results of the analysis.

In addition, an embodiment implementing the information-processing apparatus according to the present, invention is characterized in that the data processing unit carries out processing to construct the FPOMDP by:

constructing a (Bayesian Network) for each individual one of observation elements, which are included in an observation space defined in the POMDP as one of the information spaces, as a BN including the individual observation element; and combining the BNs each constructed for an individual one of the observation elements as a BN including the individual observation element in order to create a combined BN.

In addition, another embodiment implementing the information-processing apparatus according to the present invention is characterized in that:

the information spaces defined in the POMDP are a state space, an action space, a reward space and the aforementioned observation space; and on the basis of learning sample data, the data processing unit carries out processing to determine relationships between any observation element included in the observation space defined as one of the information spaces in the POMDP and an element included in at least one of the .information spaces defined in the POMDP as information spaces other than the observation space in order to carry out a process to construct a BN for each individual one of the observation elements as a BN including the individual observation element.

In addition, a further embodiment implementing the information-processing apparatus according to the present invention is characterized in that the data processing unit carries out processing to:

construct a BN for each individual one of observation elements, which are included in an observation space defined in the POMDP as one of the information spaces, as a including the individual observation element;

combine a plurality of BNs each constructed for an individual one of the observation elements included in the observation space as a BN including the individual observation element in the same event observation domain in order to construct a combined BN corresponding to an intra-network; and analyze relationships between elements in a plurality of combined BNs each corresponding to one of the intra-networks in different event observation domains in order to construct a DBN (Dynamic Bayesian Network) corresponding to an inter-network including information on relations between elements in the different event observation domains.

In addition, a still further embodiment implementing the information-processing apparatus according to the present invention is characterized in that the data processing unit carries out processing to determine relationships between elements included in BNs each corresponding to one of a plurality of intra-networks on the basis of the learning sample data.

In addition, a still further embodiment implementing the information-processing apparatus according to the present invention is characterized in that the data processing unit carries out processing to construct an FPOMDP by:

applying a DAG (Directed Acyclic Graph) to each BN as data showing relations between elements included in the BN; and updating the DAG on the basis of information obtained as a result of execution of a learning process based on the learning sample data and analyzing relations between elements in processing to construct an FPOMDP.

In addition, a still further embodiment implementing the information-processing apparatus according to the present invention is characterized in that the data processing unit:

inputs element information including types of elements included in information spaces defined in the POMDP as well as Max-Fan-In used as information on the configuration of the FPOMDP to show the state of connections of nodes in each BN; and constructs a FPOMDP in accordance with these pieces of aforementioned input information.

In accordance with a second embodiment of the present invention, there is provided an information processing method to be adopted by an information-processing apparatus as a method for constructing an information analysis processing configuration to be applied to information analysis processing in an observation domain including an uncertainty. The information processing method is characterized in that the information processing method includes:

an intra BN (Bayesian Network) generation step of driving a data processing unit employed in the information-processing apparatus to construct a BN (Bayesian Network) for each individual one of observation elements, which are included in an observation space defined as one of information spaces in a POMDP (Partially Observable Markov Decision Process), as a BN including the individual observation element and combine a plurality of BNs each constructed for one of the observation elements included in the observation space as BNs in the same event observation domain in order to construct a combined BN corresponding to an intra-network;

a DBN (Dynamic Bayesian Network) generation step of driving the data processing unit to analyze relationships between elements in a plurality of combined BNs each corresponding to one of the intra-networks in different event observation domains in order to construct a DBN (Dynamic Bayesian Network) corresponding to an inter-network including information on relations between elements in the different event observation domains; and an FPOMDP (Factored. Partially Observable Markov Decision Process) generation step of driving the data processing unit to generate an FPOMDP (Factored Partially Observable Markov Decision Process) including information on relations between elements pertaining to the information spaces defined in the POMDP on the basis of the DBN.

In addition, an embodiment implementing the information processing method according to the present invention is characterized in that:

the information spaces defined in the POMDP are a state space, an action space, a reward space and the aforementioned observation space; and the intra BN generation step includes the step of driving the data processing unit to carry out processing to determine relationships between any observation element included in the observation space defined as one of the information spaces in the POMDP and an element included in at least one of the information spaces defined in the POMDP as information spaces other than the observation space on the basis of learning sample data in order to carry out a process to construct a BN for each individual one of the observation elements as a EN including the individual observation element.

In addition, another embodiment implementing the information processing method according to the present invention is characterized in that, at the DBN generation step, the data processing unit is driven to carry out processing to determine relationships between elements included in BNs each corresponding to one of a plurality of intra-networks on the basis of the learning sample data.

In addition, a further embodiment implementing the information processing method according to the present invention is characterized in that, at the intra BN generation step and the DBN generation step, the data processing unit is driven to carry out processing to construct an FPOMDP by:

applying a DAG (Directed Acyclic Graph) to each BN as data showing relations between elements; and updating the DAG on the basis of information obtained as a result of execution of a learning process based on the learning sample data and analyzing relations between elements in processing to construct an FPOMDP.

In addition, a still further embodiment implementing the information processing method according to the present invention is characterized in that the data processing unit is driven to:

input element information including types of elements included in information spaces defined in the POMDP as well as Max-Fan-In used as information on the configuration of the FPOMDP to show the state of connections of nodes in each BN; and construct a FPOMDP in accordance with these pieces of aforementioned input information.

In accordance with a third embodiment of the present invention, there is provided a computer program to be executed by an information-processing apparatus as a program for constructing an information analysis processing configuration to be applied to information analysis processing in an observation domain including an uncertainty. The computer program is characterized in that the computer program is executed to drive a data processing unit employed in the information-processing apparatus to carry out processing includes:

an intra BN (Bayesian Network) generation step of driving the data processing unit to construct a BN (Bayesian Network) for each individual one of observation elements, which are included in an observation space defined as one of information spaces in a POMDP (Partially Observable Markov Decision Process), as a BN including the individual observation element and combine a plurality of BNs each constructed for one of the observation elements included in the observation space as BNs in the same event observation domain in order to construct a combined BN corresponding to an intra-network;

a DBN (Dynamic Bayesian Network) generation step of driving the data processing unit to analyze relationships between elements in a plurality of combined BNs each corresponding to one of the intra-networks in different event observation domains in order to construct a DBS (Dynamic Bayesian Network) corresponding to an inter-network including information on relations between elements in the different event observation domains; and an FPOMDP (Factored Partially Observable Markov Decision Process) generation step of driving the data processing unit to construct an FPOMDP (Factored Partially Observable Markov Decision Process) including information on relations between elements pertaining to the information spaces defined in the POMDP on the basis of the DBN.

It is to be noted that the computer program is a program written in a format that can be read by a computer employed in a computer system capable of executing various kinds of program code. The computer program written in such a format is supplied to the computer system by making use of a recording medium such as a CD (Compact Disk), an FD (Floppy Disk) or an MO (Magneto-optical) disk or making use of a communication medium such as a network. By supplying the computer program written in a format readable by a computer to a computer system employing the computer, the computer system is capable of carrying out processing according to the program.

These and other features of the present invention will become clear from the following description of the preferred embodiments given with reference to the accompanying diagrams. It is also to be noted that the technical term 'system' used in this specification implies the configuration of a confluence including a plurality of apparatus, which do not have to be physically accommodated in the same cabinet.

According to the configurations of the embodiments of the present invention, a POMDP (Partially Observable Markov Decision Process) is taken as a basic configuration and, for each of a state space, an action space, a reward space and an observation space, which are each defined in the POMDP as an information space, a plurality of different elements (or factors) are set in order to make it possible to automatically construct an FPOMDP (Factored POMDP) clarifying relations between the elements. In state-transition prediction and action-determination processing applying the FPOMDP generated by a carrying out a process in accordance with the present invention as a process clarifying a dependence relation set for each element as a relation between two elements, it is possible to perform a process to clearly differentiate a cause-effect relation set for each element as a cause-effect relation between two elements from any other cause-effect relation. Thus, it is possible to carry out processing to predict a state transition more correctly and processing to determine an action more effectively.

BRIEF DESCRIPTION OF THE DRAWINGS

FIG. 4 is an explanatory diagram, in which (A) is referred to in description of elements (or factors) of a state space and elements (or factors) of an observation space, (B1) is referred to in description of a typical configuration of a BN including an observation element [nobs], and (B2) is referred to in description of a typical configuration of a BN including another observation element [nobs];

FIG. 5 is an explanatory diagram, in which (A) is referred to in description of elements (or factors) of a state space and elements (or factors) of an observation space, (B3) is referred to in description of a typical configuration of a BN including a further observation element [nobs], and (B4) is referred to in description of a typical configuration of a BN including a still further observation element [nobs];

FIG. 6 is an explanatory diagram, in which (CI) is referred to in description of a typical configuration of a BN obtained as a result of combining BNs each including an observation element [nobs] with Max-Fan-In set at 1, and (C2) is referred to in description of a typical configuration of a BN obtained as a result of combining BNs each including an observation element [nobs] with Max-Fan-In set at 2;

FIG. 11 shows a flowchart representing a sequence to construct an FPOMDP;

FIG. 13 shows a flowchart representing another partial sequence to construct an FPOMDP;

FIG. 14 is a block diagram showing the functional configuration of an information-processing apparatus; and FIG. 15 is a block diagram showing a typical hardware configuration of the information-processing apparatus.

DETAILED DESCRIPTION OF THE PREFERRED EMBODIMENTS

By referring to diagrams, the following description explains details of an information-processing apparatus according to an embodiment of the present invention, details of an information processing method adopted by the information-processing apparatus and details of a computer program implementing the information processing method.

Figure 2:
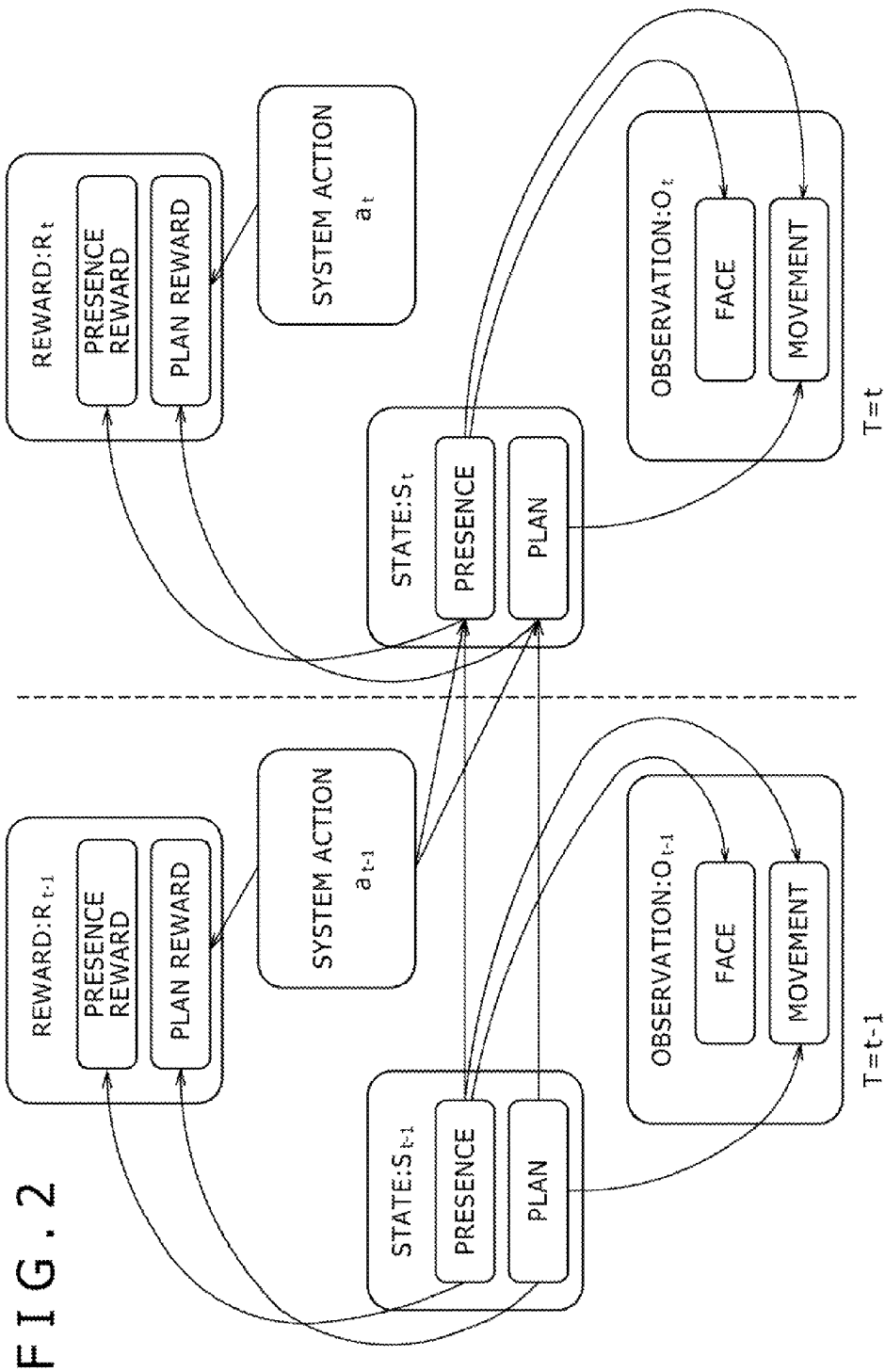
FIG. 2 is an explanatory diagram to be referred to in description of an FPOMDP (Factored Partially Observable Markov Decision Process)

First of all, by referring to FIG. 2, the following description explains an outline of processing to predict a state transition and/or determine an action by application of a POMDP (Partially Observable Markov Decision Process) constructed in an information-processing apparatus according to the present invention as a POMDP taking a variety of elements (or factors) different from each other into consideration. The POMDP taking a variety of elements (or factors) different from each other into consideration is referred to as an FPOMDP (Factored Partially Observable Markov Decision Process), which is an improved POMDP constructed by carrying out processing according to the present invention. In the FPOMDP, by carrying out processing taking a variety of elements (or factors) different from each other into consideration, it is possible to predict a state transition and/or determine an action with a higher degree of precision. To put it concretely, it is possible to raise the degree of precision in various kinds of action determination processing such as processing to determine an action to be taken by a robot, a simulation making use of a computer, data processing and processing to determine an optimum action in business management.

As described earlier, the POMDP is carried out as a process applying the following pieces of information:

(a): State space: S (b): Action space: A (c): State-transition probability computation function for computing a probability P of a transition from a state S existing at a time T=(t−1) to a state S existing at a next time T=t: T $(s_t, a_{t-1}, s_{t-1})$=P $(s_t|a_{t-1}, s_{t-1})$.

In this case, symbol $s_t$ denotes the state S existing at the time T=t, symbol $s_{t-1}$ denotes the state S existing at the time T=(t−1) and symbol $a_{t-1}$ denotes an action A taken at the time T=(t−1). It is thus obvious that the probability P is computed from $s_{t-1}$ representing the state S existing at the time T=(t−1) and $a_{t-1}$ representing the action A taken at the time T=(t−1).

(d): Reward function for computing a reward from st representing the state S existing at the time T=t and at representing the action A taken at the time T=t: R $(s_t, a_t)$.

(e): Observation space: Ω

(f): Observation-generation probability computation function for computing a probability P of generation of an observation state at the time T=t: O $(s_t, a_{t-1}, o_{t-1})$=P $(o_t| a_{t-1}, s_t)$.

In this case, symbol $o_t$ denotes an observation generated at the time T=t. It is thus obvious that the probability P is computed from $s_t$ representing the state S existing at the time T=t and $a_{t-1}$ representing the action A taken at the time T=(t−1).

Figure 1:
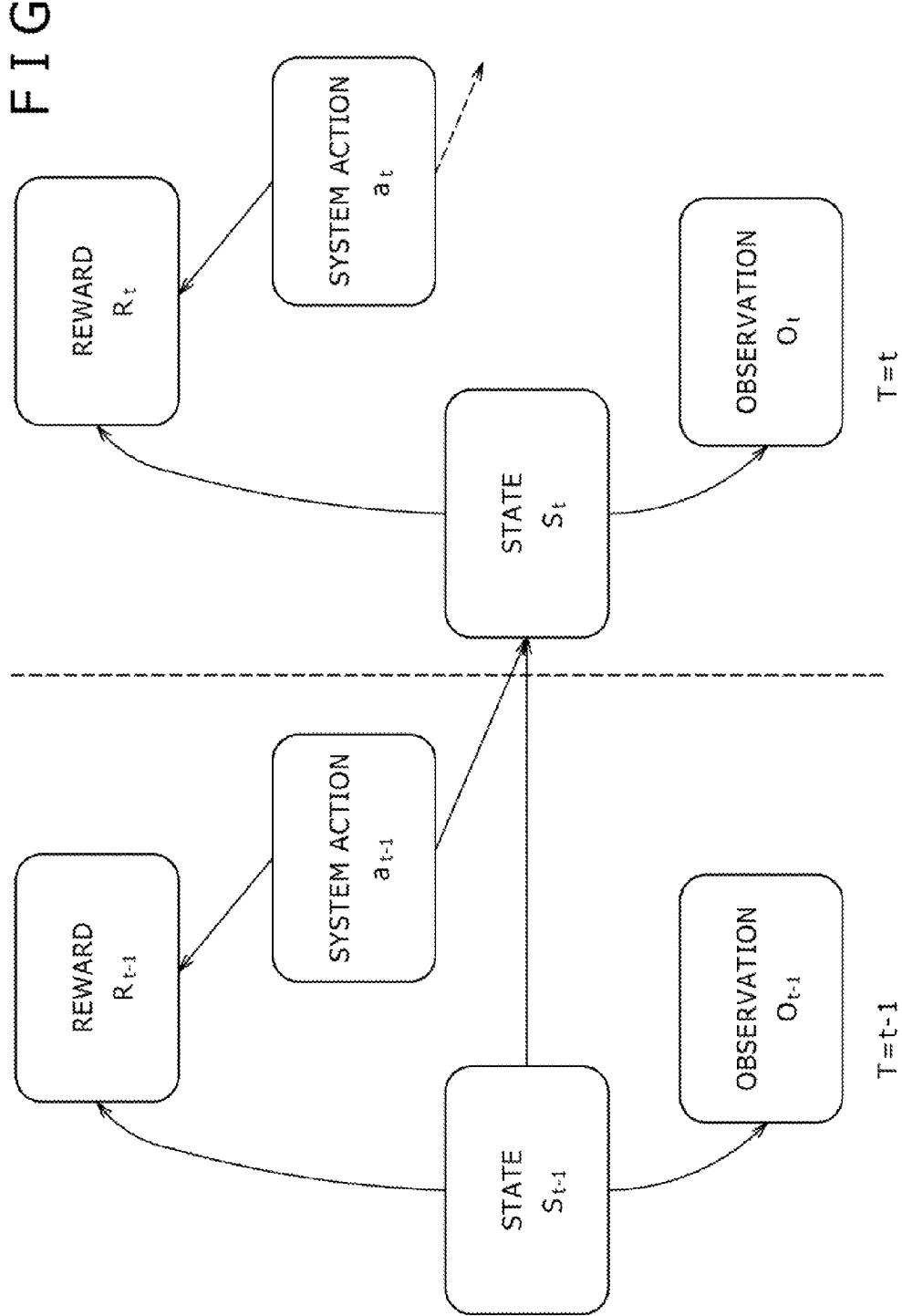
FIG. 1 is an explanatory diagram to be referred to in description of the traditional POMDP (Partially Observable Markov Decision Process)

Much like FIG. 1, FIG. 2 is a diagram showing $s_{t-1}$ representing the state S existing at the time T=(t−1), $a_{t-1}$ representing the action A taken at the time T=(t−1), $R_{t-1}$ representing a reward R given at the time T=(t−1) and $o_{t-1}$ representing an observation generated at the time T=(t−1) as well as $s_t$ representing the state S existing at the time T=t, $a_t$ representing the action A taken at the time T=t, $R_t$ representing a reward R given at the time T=t and $o_t$ representing an observation generated at the time T=t following the time T=(t−1). In FIG. 2, an arrow between two blocks each representing an element included in an information space such as the reward space, the state space, the action space or the observation space indicates a relationship between the two blocks or an effect of one of the two blocks on the other block. To put it concretely, an arrow between a parent serving as a block originating the arrow and a child serving as a block pointed to by the arrow indicates a relationship between the parent and the child or an effect of the parent on the child.

In the configuration explained earlier by referring to FIG. 1, each of the state space, the reward space, the action space and the observation space for each of the times is processed as an information space including only one element. The configuration shown in FIG. 2 is different from the configuration explained earlier by referring to FIG. 1 in that, in the case of the configuration shown in FIG. 2, each of the state space, the reward space and the observation space for each of the times is processed by considering each of a plurality of elements included in an information space, that is, by considering each of a plurality of elements included in each of the state space, the reward space and the observation space. That is to say, FIG. 2 shows information spaces, i.e., the reward space, the state space and the observation space for the POMDP individually considering a plurality of elements (or factors) included in each of the state space, the reward space and the observation space. In the typical configuration shown in FIG. 2, the action spaces for the times T=(t−1) and T=t each include only one element.

In the typical configuration shown in FIG. 2, each of the state space, the reward space and the observation space for each of the times T=(t−1) and T=t includes two elements. It is to be noted, however, that the number of elements included in each of the reward space, the state space and the observation space for each of the times is by no means limited to two. That is to say, with the information-processing apparatus according to the present invention, it is possible to construct, a configuration of the POMDP in which any arbitrary number of elements are included in an information space pertaining to the same category.

In the configuration shown in. FIG. 2, the state category (or state space) includes two different elements defined as follows:

state element 1 referred to as presence is a state indicating whether or not a human being, a thing or the like exists.

state element 2 referred to as a plan is a state typically indicating data processing or the processing state of a plan such as an action plan.

In the configuration shown in FIG. 2, the reward category (or the reward space) includes two different elements defined as follows:

reward element 1 is a reward corresponding to the presence serving as state element 1. reward element 2 is a reward corresponding to the plan serving as state element 2.

In the configuration shown in FIG. 2, the observation category (or the observation space) includes two different elements defined as follows:

observation element 1 referred to as a face is an observation space element representing a change of the expression of a human being or a change of the appearance of a thing.

observation element 2 referred to as a movement is an observation space element representing an action taken by a human being or a behavior of a thing.

The information-processing apparatus according to the present invention has a POMDP configuration different from the POMDP configuration explained earlier by referring to FIG. 1. To be more specific, the information-processing apparatus according to the present invention constructs a configuration of the POMDP as a configuration allowing the processing based on the POMDP to be carried out to predict a state transition and/or determine an action by individually handling elements included in each information space. In order to differentiate the POMDP individually considering a plurality of elements included in an information space pertaining to the same category as shown in FIG. 2 from the traditional POMDP explained earlier by referring to FIG. 1, the POMDP with a configuration shown in FIG. 2 is referred to as an FPOMDP (Factored POMDP). In the case of the typical configurations shown in FIGS. 1 and 2, the information space is classified into the reward, state, action and observation categories.

The information-processing apparatus according to the present invention automatically constructs an FPOMDP by identifying elements included in each of information spaces defined for the POMDP spaces of the reward, state, action and observation categories, determining relations between the elements and setting arrows each representing a relation between two elements as shown in FIG. 2. Each of the arrows shown in the configuration of FIG. 2 as an arrow representing a relation between two elements is an arrow indicating an effect of a parent represented by a block originating the arrow on a child represented by a block pointed to by the arrow.

The information-processing apparatus according to the present invention defines elements of each information space, i.e., each of the state space, the action space, the reward space and the observation space and analyzes relations between the elements in order to set arrows each indicating a relation between any two elements as shown in FIG. 2 in a process to construct an FPOMDP (Factored POMDP). In the process to analyze the relations between the elements, a BN (Bayesian Network) is used. A concrete sequence to construct the FPOMDP will be described later in detail.

Much like FIG. 1, FIG. 2 serving as an explanatory diagram: of an FPOMDP shows $s_{t-1}$ representing the state S existing at the time T=(t−1), $a_{t-1}$ representing the action A taken at the time T=(t−1), $R_{t-1}$ representing a reward R given at the time T=(t−1) and $o_{t-1}$ representing an observation generated at the time T=(t−1) as well as $s_t$ representing the state S existing at the time T=t, $a_t$ representing the action A taken at the time T=t, $R_t$ representing a reward R given at the time T=t and $o_t$ representing an observation generated at the time T=t following the time T=(t−1). Each arrow originating from any specific block and pointing to another block shows a relation between an element represented by the specific block and another element represented by the other block as described above. That is to say, a relation between any two elements is defined as an arrow.

For example, at the time T=(t−1), a presence reward serving as one of reward elements is found by making use of the aforementioned reward function R $(s_{t-1}, a_{t-1})$ based on a presence state element of the time T=(t−1) and the action of the time T=(t−1).

By the same token, a plan reward serving as one of reward elements is found by making use of the aforementioned reward function R $(s_{t-1}, a_{t-1})$ based on a plan state element of the time T=(t−1) and the action of the time T=(t−1).

As for the observation space, a face observation element is defined as an observable observation element on which the presence state element has an effect whereas a movement observation element is defined as an observable observation element on which both the presence state element and the plan state element have effects.

These relations described above hold true of elements of the times T=(t−1), t, (t+1) and so on.

In a relation between information spaces for different times, the relation among $s_t$ representing the state S of the time T=t, $s_{t-1}$ representing the state S of the time T=(t-1) and $a_{t-1}$ representing the action A of the time T=(t-1) are associated with each other by the state-transition probability computation function T=t: T $(s_t, a_{t-1}, s_{t-1})$=P $(s_t|a_{t-1}, s_{t-1})$ described above on the basis of relations between elements of $s_t$, $s_{t-1}$, and $a_{t-1}$. That is to say, the probability that the presence state element of the time T=t is generated is computed from the presence state element of the time T=(t-1) and the action of the time T=(t-1). By the same token, the probability that the plan state element of the time T=t is generated is computed from the plan state element of the time T=(t-1) and the action of the time T=(t-1). These relations hold true of information spaces of any consecutive event observation times.

As described above, in the case of the FPOMDP (Factored POMDP), instead of setting each of the state space, the action space, the reward space and the observation space as an information space, each of the state space, action, reward and observation categories of the information space is divided into finer elements (or factors), which are extracted in the execution of processing to handle the categories. In the configuration shown in FIG. 2, elements of the action space are not defined. It is to be noted, however, that processing can also be carried out by dividing the action space into elements. In a process to determine the action to be taken by a robot, for example, action elements such a hand movement, a leg movement and a face movement, can also be defined separately to be handled as elements of the action space in the processing.

The information-processing apparatus according to the present invention identifies a variety of elements included in each of the information spaces, i.e., the state space, the action space, the reward space and the observation space, which are defined in the FPOMDP, and analyzes the relationships between the elements in order to construct an FPOMDP (Factored POMDP) like the one shown in FIG. 2. In the process to analyze the relations between the elements, a BN (Bayesian Network( is used. The BN is a network expressing the dependence relations between probability variables in a directed graph format such as the format of a graph describing each of events as a node and each cause-effect relation between events as a link. By carrying out a learning process making use of learning sample data, it is possible to obtain CPTs (Conditional Probability Tables) summarizing probabilities that events represented by the nodes composing the BN occur on the basis of individual conditions.

The BN (Bayesian Network) and the CPTs (Conditional Probability Tables) are explained by referring to FIG. 3 as follows. The BN is used for a probability inference purpose. By making use of the BN, in particular, it is possible to quantitatively handle predictions and determinations of intentions in an observation domain including uncertainty making it possible to observe only some events. In accordance with the basis of this algorithm, a plurality of events are each set as a node, and a model of dependence relations between the nodes is created.

Figure 3:
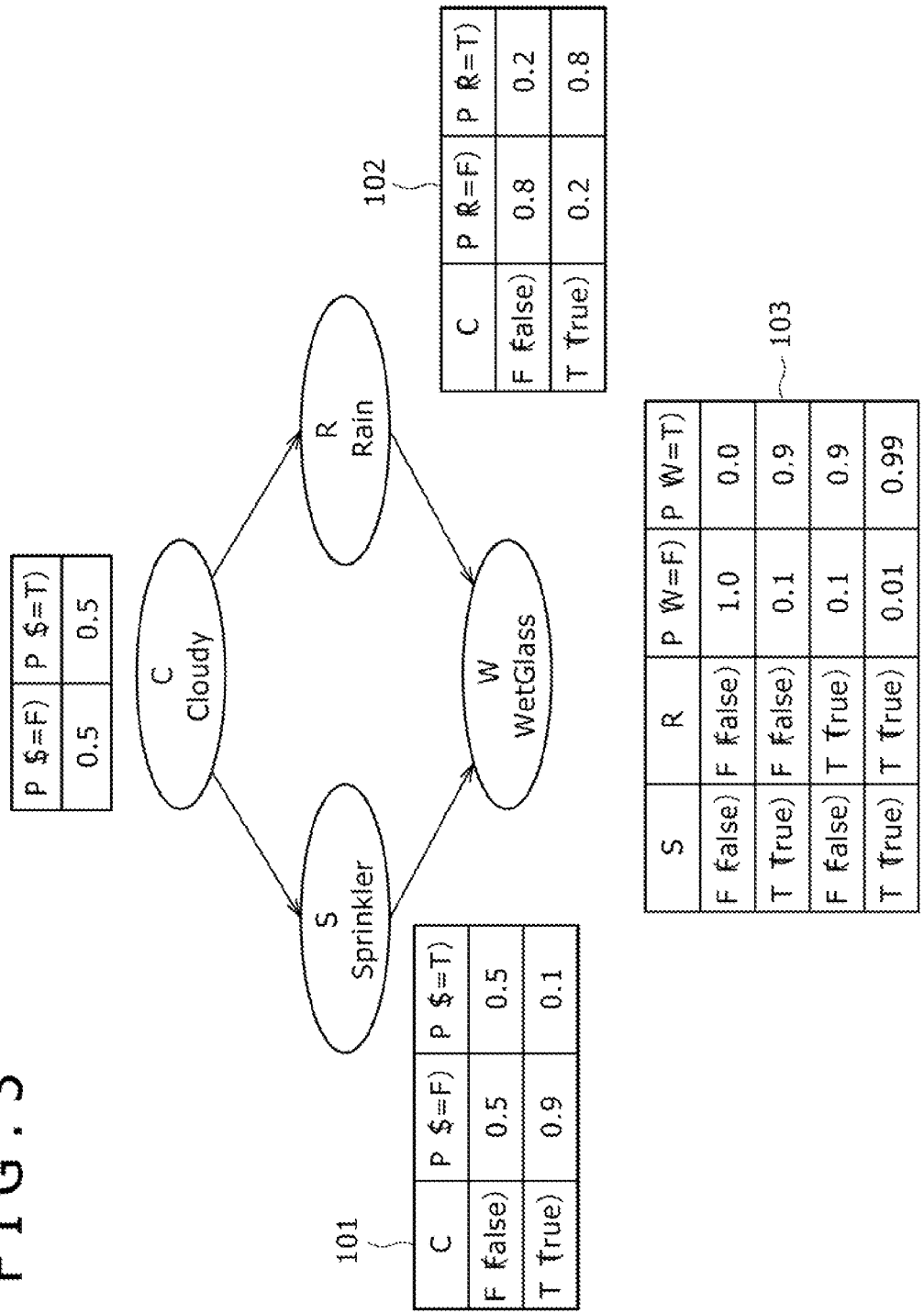
FIG. 3 is an explanatory diagram to be referred to in description a BN (Bayesian Network) and a CPT (Conditional Probability Table)

The typical BN shown in FIG. 3 includes four event nodes, i.e., Cloudy, Sprinkler, Rain and WetGlass nodes. Each arrow originating from a parent occurrence node and pointing to a child occurrence node indicates that the state of the parent occurrence node has an effect on the state of the child occurrence node.

A typical CRT shown in the figure for the Cloudy occurrence node has the following probability values:

the probability that the occurrence of a Cloudy event is true is 0.5; and the probability that the occurrence of the Cloudy event is false is 0.5.

With the probability of the occurrence of the Cloudy event having values as described above, the Sprinkler child occurrence node having the Cloudy occurrence node as a parent occurrence node has a CPT 101 shown in FIG. 3. The CPT 101 shows the values of the probability that the occurrence of the Sprinkler event is true, that is, the probability that the Sprinkler event occurs and the values of the probability that the occurrence of the Sprinkler event is false, that is, the probability that, the Sprinkler event does not occur. As shown in the figure, the state of the Cloudy parent occurrence node has an effect on the values of the probability for the Sprinkler child occurrence node.

The typical CPT 101 shown in the figure for the Sprinkler occurrence node has the following probability values:

If the occurrence of the Cloudy event represented by the Cloudy parent occurrence node is F (false), the probability that the occurrence of the Sprinkler event is false is 0.5 and the probability that the occurrence of the Sprinkler event is true is 0.5.

If the occurrence of the Cloudy event represented by the Cloudy parent occurrence node is T (true), on the other hand, the probability that the occurrence of the Sprinkler event is false is 0.9 and the probability that the occurrence of the Sprinkler event is true is 0.1.

In the OPT 101, notation P (S=F) denotes the probability (or the possibility) that the occurrence of the Sprinkler child occurrence node is false. On the other hand, notation P (S=T) denotes the probability (or the possibility) that the occurrence of the Sprinkler child occurrence node is true.

By the same token, the Rain child occurrence node having the Cloudy occurrence node as a parent occurrence node has a CPT 102 shown in FIG. 3. The OPT 102 shows the values of the probability that the occurrence of the Bain event is true, that is, the probability that the Rain event occurs and the values of the probability that the occurrence of the Rain event is false, that is, the probability that the Rain event does not occur. As shown in the figure, the state of the Cloudy parent occurrence node has an effect on the values of the probability for the Rain child occurrence node.

The typical CPT 102 shown in the figure for the Rain occurrence node has the following probability values:

If the occurrence of the Cloudy event represented by the Cloudy parent occurrence node is F (false), the probability that the occurrence of the Rain event is false is 0.8 and the probability that the occurrence of the Rain event is true is 0.2.

If the occurrence of the Cloudy event represented by the Cloudy parent occurrence node is T (true), on the other hand, the probability that the occurrence of the Rain event is false is 0.2 and the probability that the occurrence of the Rain event is true is 0.8.

In the same way, the WetGlass child occurrence node having the Sprinkler and Rain occurrence nodes as parent occurrence nodes has a CPT 103 shown in FIG. 3. The CPT 103 shows the values of the probability that the occurrence of the WetGlass event is true, that is, the probability that the WetGlass event occurs or the lawn grass gets wet and the values of the probability that the occurrence of the WetGlass event is false, that is, the probability that the WetGlass event does not occur or the lawn grass does not get wet. As shown, in the figure, the states of the Sprinkler and Rain parent occurrence nodes each have an effect on the values of the probability for the WetGlass child occurrence node.

The typical CPT 103 shown in the figure for the Rain occurrence node has the following probability values:

If the occurrence of the Sprinkler event represented by the Sprinkler parent occurrence node is F (false) and the occurrence of the Rain event represented by the Rain parent occurrence node is F (false), the probability that the occurrence of the WetGlass event is false is 1.0 and the probability that the occurrence of the WetGlass event is true is 0.0.

If the occurrence of the Sprinkler event represented by the Sprinkler parent occurrence node is T (true) and the occurrence of the Rain event represented by the Rain parent occurrence node is F (false), the probability that the occurrence of the WetGlass event is false is 0.1 and the probability that the occurrence of the WetGlass event is true is 0.9.

If the occurrence of the Sprinkler event represented by the Sprinkler parent occurrence node is F (false) and the occurrence of the Rain event, represented by the Rain parent occurrence node is T (true), the probability that the occurrence of the WetGlass event is false is 0.1 and the probability that the occurrence of the WetGlass event is true is 0.9.

If the occurrence of the Sprinkler event represented by the Sprinkler parent occurrence node is T (true) and the occurrence of the Rain event represented by the Rain parent occurrence node is T (true), the probability that the occurrence of the WetGlass event is false is 0.01 and the probability that the occurrence of the WetGlass event is true is 0.99.

As is obvious from the above description, a CPT (Conditional Probability Table) is a table showing distributions of the probability of the occurrence of each child node as distributions of a probability dependent on the probabilities of conditions of parent nodes. In this way, by applying a BN, it is possible to create CPTs each showing the values of conditional probability that a result is obtained under a condition that the cause of the result has occurred.

In the configuration according to the present invention, the dependent relations between elements included in the information spaces such as the state space, the action space, the reward space and the observation space are expressed by making use of a BN and CPTs for the information spaces and elements included in each of the state space, the action space, the reward space and the observation space are found by carrying out a learning process in processing to construct an FPOMDP (Factored POMDP).

An algorithm adopted by the information-processing apparatus to generate an FPOMDP (Factored POMDP) includes the following processing steps:

Step 1:

Create a BN for each individual one of observation elements [nobs] as a BN including the individual observation element [nobs].

Step 2:

Create a synthesized BN by synthesizing a plurality of BNs set at Step 1 as BNs each including an observation element [nobs].

Step 3:

Typically, determine connections between information spaces such as the state space and the action space as connections between information spaces of different event observation times.

Step 4:

Complete an FPOMDP on the basis of the synthesized BN generated at Step 3.

By execution of Steps 1 to 4 described above, an FPOMDP (Factored POMDP) is created as a POMDP including arrows each showing a relationship between elements as shown in FIG. 2 and including generation probabilities each showing an effect of an element on another element. The processing of each of the steps described is explained by referring to diagrams. It is to foe noted that in the following concrete description:

The observation space has four elements, i.e., FaceDir, Movement, FaceSize and Speech.

Four elements of information spaces other than the observation space are Player, Intention, Channel and Signal.

Typical processing to set the above elements is explained as follows.

Step 1

The processing carried out at Step 1 is explained by referring to FIGS. 4 and 5 as follows. The processing of Step 1 is processing to create a BN for each individual one of observation elements [nobs] as a BN including the individual observation element [nobs]. FIGS. 4 and 5 are diagrams referred to in explanation of typical processing to create a BN for each individual one of observation elements as a BN including the individual observation element.

As shown in (A) of FIG. 4 and (A) of FIG. 5, four observation elements and four state elements are set. The four observation elements are FaceDir, Movement, FaceSize and Speech. These observation elements are observed individually by typically making use of a camera, a microphone or the like.

On the other hand, Player, Intention, Channel and Signal are each set as an element of information spaces other than the observation space. These elements are each an element for which an individual independent state can be set. In this embodiment, these elements pertain to the state space. There are cases in which the four Player, Intention, Channel and Signal elements pertaining to the state space have mutual dependence relations. However, the four FaceDir, Movement, FaceSize and Speech elements pertaining to the observation space do not have mutual dependence relations. That is to say, there are no arrows set between any two of the observation elements.

Under such conditions, dependence relations between elements are verified by making use of learning sample data. In this case, a structure learning algorithm is applied to the processing to verify the dependence relations between elements. To put it concretely, for example, processing based on a K2 algorithm known as the structure learning algorithm for a BN is carried out.

The K2 algorithm includes the following steps:

S1:

Select candidates for parent nodes from nodes, select a child node from the nodes, select each candidate for a parent node servable as the parent node of the selected child node and generate a directed graph.

S2:

Execute evaluation determining a parameter on the basis of the generated graph, and set only a parent-node candidate with a high evaluation as a parent, node.

The processing of the above steps S1 and S2 is carried out as the processing to construct dependence relations between elements.

In this typical processing, the 4 FaceDir, Movement, FaceSize and Speech observation elements as well as the 4 Player, Intention, Channel and Signal state elements are used as nodes. Then, the processing according to the algorithm is carried out individually for each of the FaceDir, Movement, FaceSize and Speech observation elements.

Results of the processing are shown in (B1) and (B2) of FIG. 4, and (B3) and (B4) of FIG. 5. To be more specific, (B1) of FIG. 4 shows a result of processing carried out by adopting the K2 algorithm known as the structure learning algorithm of a BN and setting the FaceDir observation element as well as the four Player, Intention, Channel and Signal state elements as nodes each to be analyzed. The processing result is also an analysis result revealing the fact that the FaceDir observation element serving as a child node has the Player and Channel state elements as parent nodes.

(B2) of FIG. 4 shows a result of processing carried out by adopting the K2 algorithm known as the structure learning algorithm of a BN and setting the Movement observation element as well as the four Player, Intention, Channel and Signal state elements as nodes each to be analyzed. The processing result is also an analysis result revealing the fact that the Movement observation element serving as a child node has the Intention and Player state elements as parent nodes.

(B3) of FIG. 5 shows a result of processing carried out by adopting the K2 algorithm known as the structure learning algorithm of a BN and setting the FaceSize observation element as well as the four Player, Intention, Channel and Signal state elements as nodes each to be analyzed. The processing result is also an analysis result revealing the fact that the FaceSize observation element serving as a child node has the Channel and Player state elements as parent nodes.

(B4) of FIG. 5 shows a result of processing carried out by adopting the K2 algorithm known as the structure learning algorithm of a BN and setting the Speech observation element as well as the four Player, Intention, Channel and Signal state elements as nodes each to be analyzed. The processing result is also an analysis result revealing the fact that the Speech observation element serving as a child node has the Signal state element as a parent node.

Step 2

Figure 7:
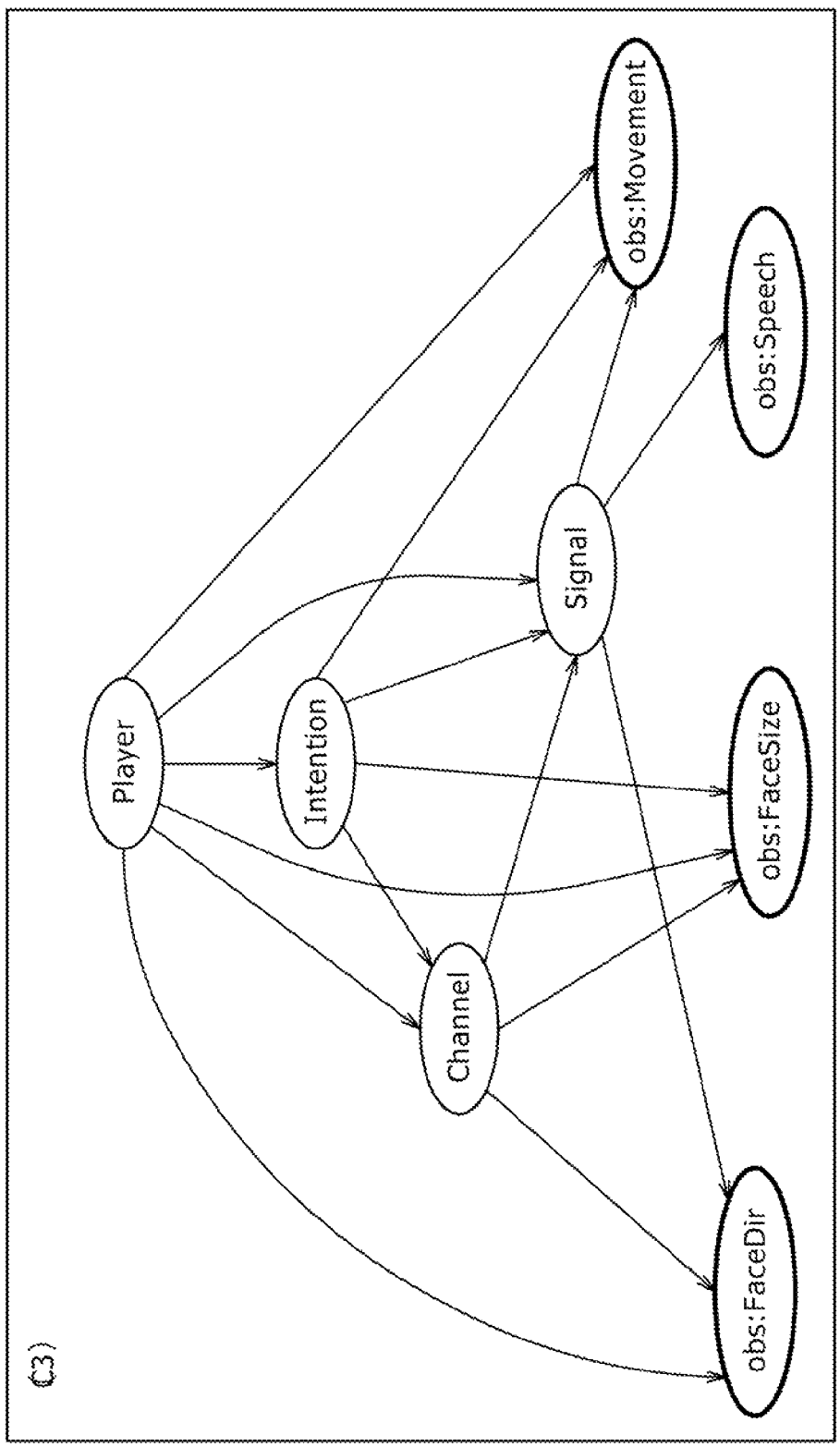
FIG. 7 is an explanatory diagram to be referred to in description of a typical configuration of a BN obtained as a result of combining BNs each including an observation element if [nobs] with Max-Fan-In set at 3.

The processing carried out at Step 2 is explained by referring to FIGS. 6 and 7 as follows. The processing of Step 2 is processing to synthesize a plurality of BNs constructed at Step 1 as BNs each including one of the observation elements [nobs] in order to create a synthesized BN.

At Step 1, four observation elements, i.e., FaceDir, Movement, FaceSize and Speech, are set. Thus, 4 BNs are created. The processing of Step 2 is carried out to combine the four BNs created at Step 1 into a large BN refereed to as the synthesized BN mentioned above.

There are a variety of methods for combining BNs. FIGS. 6 and 7 show three typical BN combination methods (c1) to (c3). In the typical BN combination method (c1) shown in FIG. 6, the maximum number of arrows each pointing to one of the four FaceDir, Movement, FaceSize and Speech observation elements is set at 1. In the typical BN combination method (c2) also shown in FIG. 6, the maximum number of arrows each pointing to one of the four observation elements is set at 2. In the typical BN combination method (c3) shown in FIG. 7, the maximum number of arrows each pointing to one of the four observation elements is set at 3. In the following description, the maximum number of arrows each pointing to an observation element is denoted by reference notation Max-Fan-In.

That is to say, the processing of Step 2 is typical processing to construct a synthesized BN by assumption of a typical value as the maximum number of parent nodes each having an effect on one of the four FaceDir, Movement, FaceSize and Speech observation elements. In the typical BN combination methods (c1), (c2) and (c3), the typical value is 1, 2 or 3.

For example, in the typical BN combination method (c1) shown in FIG. 6, Max-Fan-In representing the maximum number of arrows each pointing to one of the four FaceDir, Movement, FaceSize and Speech observation elements is set at 1. In the BNs each created for an observation element as shown in FIGS. 4 and 5, however, a plurality of arrows pointing to an observation element. In this case, typically, the relation between the observation element serving as a child node pointed to by an arrow and each parent node originating the arrow is examined to select a parent node having the highest evaluation among parent nodes each serving as the parent of the child node.

In the typical BN combination method (c2) also shown in FIG. 6, Max-Fan-In representing the maximum number of arrows each pointing to one of the four FaceDir, Movement, FaceSize and Speech observation elements is set at 2 whereas, in the typical BN combination method (c3) shown in. FIG. 7, Max-Fan-In representing the maximum number of arrows each pointing to one of the four observation elements is set at 3. By the same token, the relation between the observation element serving as a child node pointed to by an arrow and each parent node originating the arrow is examined to select two or three parent nodes for the typical BN combination method (c2) or (c3) respectively. The selected parent nodes each have a highest evaluation among parent nodes each serving as the parent of the child node. In this way, different synthesized BNs can be set by adopting the BN combination method (c1), (c2) or (c3). If it is desired to take relationships between a larger number of elements into consideration, for example, it is desirable to take a network configuration obtained as a result of adoption of the typical BN combination method (c3). If it is desired to reduce the amount of computation, on the other hand, it is desirable to take a network configuration obtained as a result of adoption of the typical BN combination method (c1). In this way, it is possible to select a network suitable for the intended processing.

The BN obtained as a result of adopting the BN combination method (c1), (c2) or (c3) at Step 2 is a network set in an event observation domain, that is, the event observation domain for the event observation time T=t or T=(t+1) in the typical configuration shown in FIG. 2. Such a BN is referred to as an intra-network. Next, it is necessary to set relationships between event observation domains included in a plurality of intra-networks set for different event observation times at Step 2 and relationships between elements pertaining to the event observation domains. The processing to set such relationships is carried out at Step 3 described below.

Step 3

The processing carried out at Step 3 is explained by referring to FIG. 8 as follows. The processing of Step 3 is carried out to determine connections between information spaces such as the state space and the action space as connections between different event observation times. To put it concretely, the processing of Step 3 is carried out to determine connections based on relationships shown in FIG. 2 as relationships between elements of the BNs constructed for the event observation time T=t and the event observation time T=(t−1). This processing is also carried out by computing a CPT for every element in each of the BNs by applying learning sample data.

Figure 8:
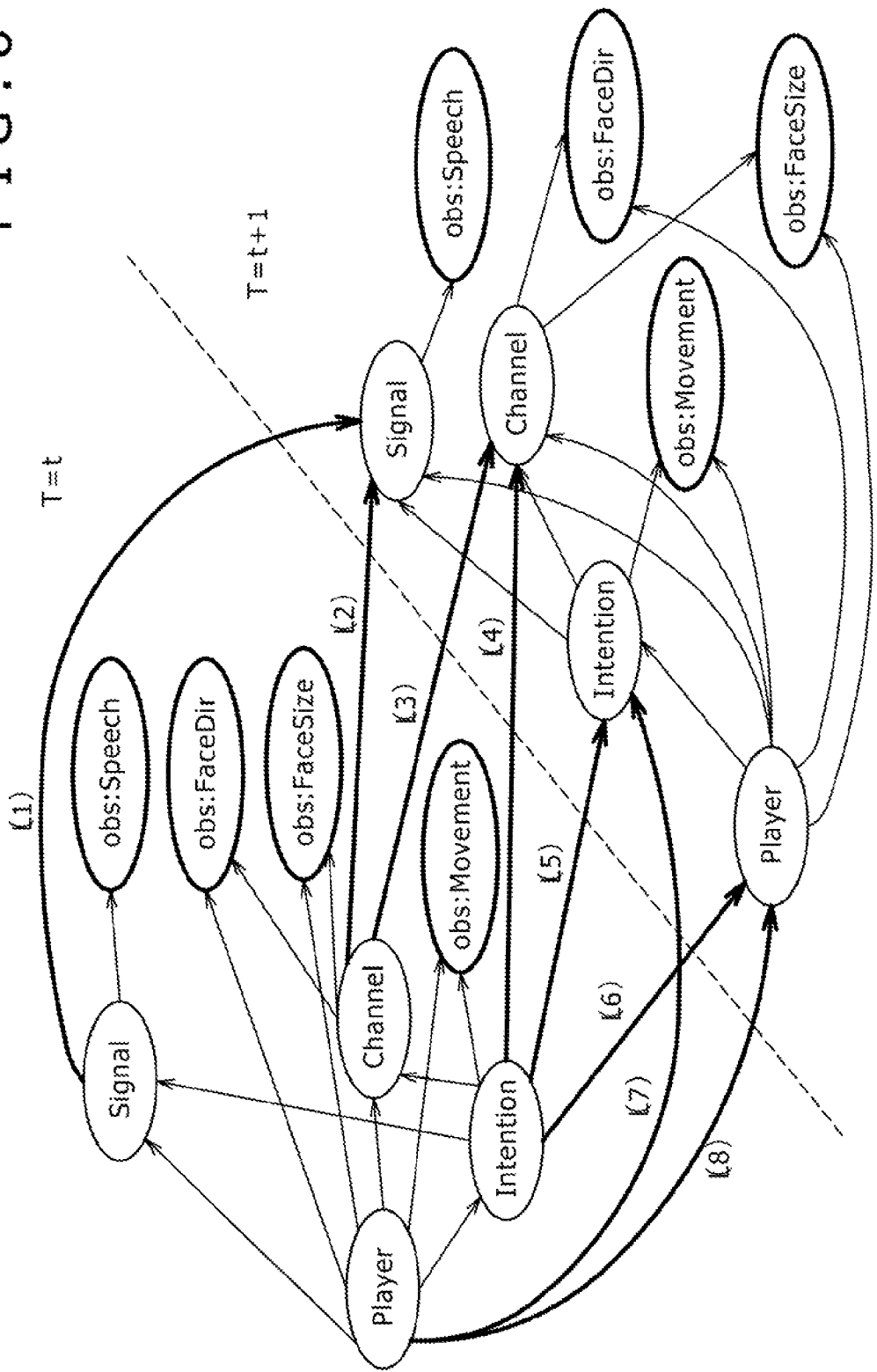
FIG. 8 is an explanatory diagram to be referred to in description of a typical configuration of a DBN (Dynamic Bayesian Network) obtained as a result of combining a BN existing at an event observation time T=t and a BN existing at an event observation time T=(t+1)

FIG. 8 is a diagram showing a BN constructed at Steps 1 and 2 for the event observation time T=t and a BN constructed at Steps 1 and 2 for the event observation time T=(t+1). At Step 3, relationships between elements of the BNs for the event observation time T=t and the event observation time T=(t+1) are analyzed in order to set connection relations. As a result, eight typical connection lines L1 to L8 each shown in FIG. 8 as a bold line are obtained.

It is to be noted that a closed network in an event observation domain is referred to as an intra-network. An example of the infra-network is a network for the event observation time T=t. On the other hand, a network spread over a plurality of event observation domains is referred to as an inter-network. An example of the inter-network is a network covering the event observation times T=t and T=(t+1) as shown in FIG. 8. A BN corresponding to an inter-network is referred to as a DBN (Dynamic Bayesian Network).

At Steps 1 and 2, CPTs are generated in each BN used as an intra-network, whereas connections between elements set as parent and child nodes are determined. At Step 3, on the other hand, CPTs are generated in a DBN (Dynamic Bayesian Network) used as an inter-network, whereas connections between elements set as parent and child nodes are determined. As a result, a DBN with connection relations shown in FIG. 8 is set.

Step 4

The processing carried out at Step 4 is explained by referring to FIG. 9 as follows. At Step 4, elements with their connection relations set on the basis of the DBN generated at Step 3 are grouped into their space categories, which are the state space, the action space, the reward space and the observation space. In addition, typically, a probability computation function representing a relation between elements is defined for every element. Examples of the probability computation function is the stats-transition probability computation function T $(s_{t+1}, a_t, s_t) = P(s_{t+1}|a_t, s_t)$ and the observation-generation probability computation function O $(s_{t+1}, a_t, o_t) = P(o_{t+1}|a_t, s_t)$. These probability computation functions are determined on the basis of CPTs (Conditional Probability Tables) explained earlier by referring to FIG. 3. That is to say, the probability computation functions can be obtained by creating CPTs as tables each constructed to collect generation probabilities on the basis of individual conditions for each of nodes composing the BN by execution of a learning process making use of learning sample data.

Figure 9:
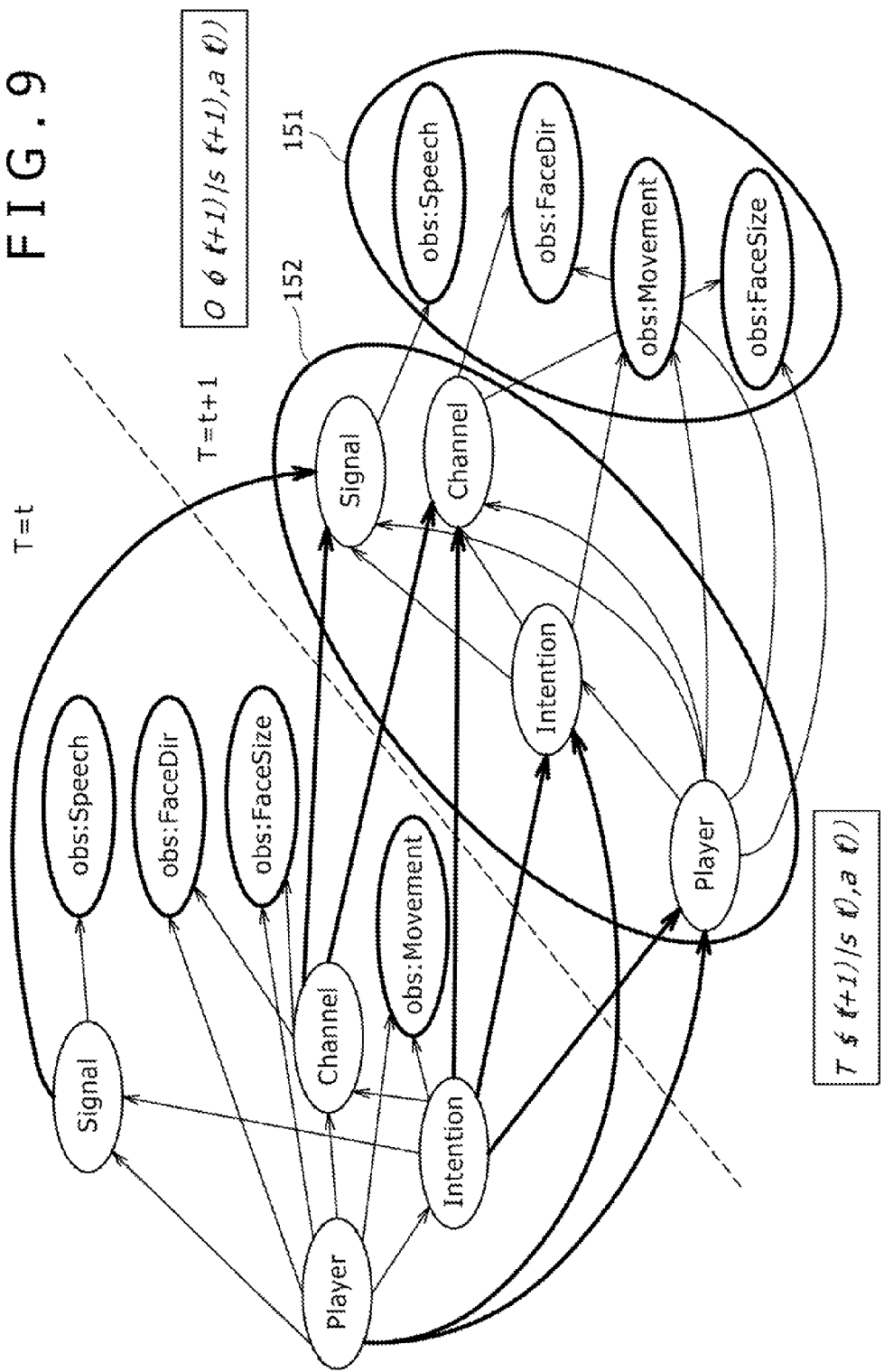
FIG. 9 is an explanatory diagram to be referred to in description of typical processing to complete an FPOMDP on the basis of a DBN.

In the typical configuration shown in FIG. 9, the four FaceDir, Movement, FaceSize and Speech elements are grouped as observation elements 151 whereas the four Player, Intention, Channel and Signal elements are grouped as state elements 152. In addition, a probability computation function is defined for each of the elements. As described above, examples of the probability computation function is the state-transition probability computation function T $(s_{t+1}, a_t, s_t) = P(s_{t+1}|a_t, s_t)$ and the observation-generation probability computation function O $(s_{t+1}, a_t, o_t) = P(o_{t+1}|a_t, s_t)$.

By carrying our the processing described above, it is possible to construct an FPOMDP (Factored POMDP) like the one shown in FIG. 2 as a POMDP clarifying dependent relations between elements included in different space categories, which are the state space, the action space, the reward space and the observation space. Then, by applying an FPOMDP clarifying dependent relations between elements, processing to predict a state transition and processing to determine an action are carried out in order to perform processing to clearly differentiate probabilities each computed for an element from each other and clearly differentiate cause-effect relations between elements from each other. Thus, processing more suitable for realities can be carried out.

In an analysis carried out in the processing described above to analyze relationships between elements, CPTs (Conditional Probability Tables) are computed by performing a learning process of BNs by making use of learning sample data in order to find relationships between parent and child nodes. It is to be noted that, in the configuration of the processing described above, as explained earlier, a BN is a network having a format expressing dependence relations between probabilities variables by making use of directed graphs, and a relationship between any two elements serving as a parent and child nodes respectively is expressed by defining one of the two elements, which originates an arrow as a parent node, and the other element pointed to by the arrow as a child node.

Figures 10A, 10B:
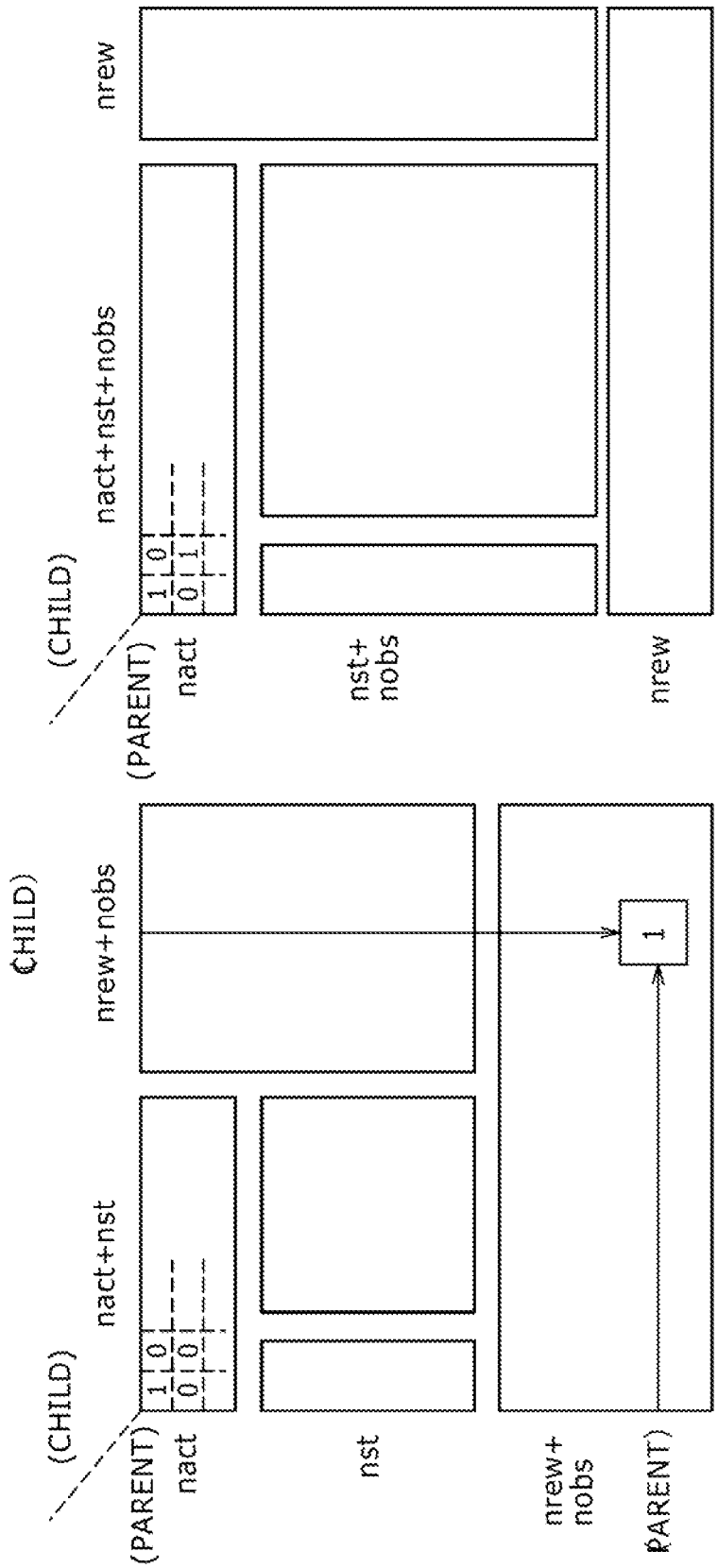
FIGS. 10A and 10B are explanatory diagrams to foe referred to in description of a typical DAG (Directed Acyclic Graph) used for expressing a BN as data.

If a DBN and a BN are each expressed as data, a DAG (Directed Acyclic Graph) can be used in the expression, FIGS. 10A and 10B are diagrams showing typical DAGs. To be more specific, FIG. 10A shows a DAG corresponding to an inter-network, which is a DBN including relations between elements in a plurality of different event observation domains explained earlier by referring to FIGS. 5 and 9. The event observation domains explained earlier by referring to FIGS. 8 and 9 are an area for the event observation times T=t and T=(t+1). In the following description, a DAG corresponding to an inter-network is referred to as an inter DAG. On the other hand, FIG. 10B shows a DAG corresponding to an intra-network, which is a BN including only relations between elements in an event observation domain explained earlier by referring to FIGS. 6 and 7. The event observation domains explained earlier by referring to FIGS. 6 and 7 are each an area for the event observation time T=t. In the following description, a, DAG corresponding to an intra-network is referred to as an intra DAG.

In a DAG, parent used in the DAG rent nodes each serving as an originator of an arrow in the BN as explained earlier are set on the vertical axis whereas child nodes each pointed to by an arrow in the BN are set on the horizontal axis. The number 1 used in the DAG indicates that an arrow is determined to exist. As described earlier, an arrow originating from a parent node and pointing to a child node represents a relationship between the parent and child nodes. On the other hand, the number 0 indicates that no arrow is determined to exist. In this way, the DAG includes data clearly representing relationships between nodes.

In the parent and child fields of each of the DAGs shown in the figure, 'nact' denotes the number of action elements, 'nst' denotes the number of state elements, 'nrew' denotes the number of reward elements and 'nobs' denotes the number of observation elements. The figure is a simplified diagram, which does not show the names of the elements. However, each symbol denoting the number of elements has a name suggesting the name of the element. In this way, element identifiers are set in each of the parent and child fields and, in addition, the number 1 is used to indicate that a relationship between the parent and child nodes exists.

That is to say, by carrying out a learning process of a BN by making use of learning sample data, it is possible to carry out processing of producing a result of determination as to whether or not a parent-child relationship between any two elements exists. That is to say, if a specific node is diagnosed to have an effect on another node, the specific node is determined to be a parent, node and the number 1 is recorded in an area included in the DAG as an area corresponding to the specific and other nodes. By carrying out a learning process of a BN by making use of various kinds of learning sample data, it is possible to fill up areas of the DAG with the numbers 1 and 0 respectively indicating that a BN arrow representing a relationship between two nodes each serving as an element exists or does not exist.

Figure 12:
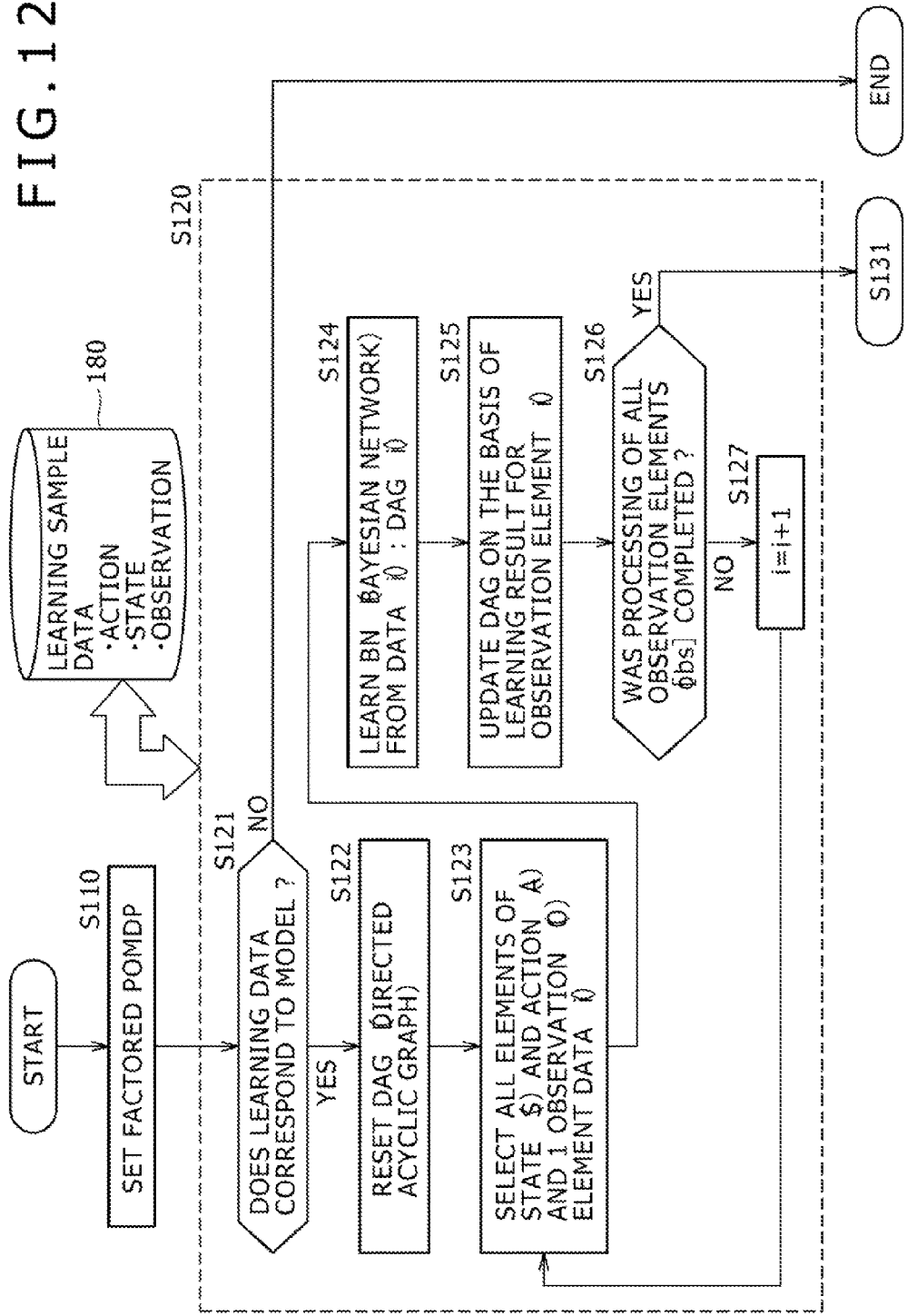
FIG. 12 shows a flowchart representing a partial sequence to construct an FPOMDP.

By referring to flowcharts shown in FIGS. 11 to 13, a sequence of constructing an FPOMDP (Factored POMDP) in accordance with the present invention is explained as follows. FIG. 11 shows a flowchart representing processing of the whole sequence to construct an FPOMDP. FIG. 12 shows a flowchart representing detailed processing carried, out at a step S120 of the flowchart shown in FIG. 11 whereas FIG. 13 shows a flowchart representing detailed processing carried out at a step S130 of the flowchart shown in FIG. 11.

First of all, by referring to the flowchart shown in FIG. 11, the whole sequence of constructing an FPOMDP (Factored POMDP) in accordance with the present invention is explained as follows. The flowchart shown in FIG. 11 begins with a step S110 at which a model of the basic FPOMDP is determined. That is to say, at the step S110, a configuration of the FPOMDP is determined. To put it concretely, elements to be included in each information space prescribed in the FPOMDP are determined. As described earlier, the information spaces are the state space, the action space, the reward space and the observation space. In a process to determine elements to be included in information space, information on the elements is determined. The information on an element includes the type of the element, and the size of the element.

The size of an element is a value representing the number of states in which the element can be put. In the case of the typical configuration of the FPOMDP shown in FIG. 2, for example, the face element is an element pertaining to the observation space. The face element is taken as a typical element to be explained as follows. In this case, for example, there are two states in which the face element can be put. The true logic value indicates that the face of a robot is facing the front of the robot while the false value indicates that the face of a robot is not facing the front of the robot. That is to say, the size of the face element is 2.

In addition, at the same step S110, Max-Fan-In explained earlier by referring to FIGS. 6 and 7 as the maximum number of input arrows pointing to an element, in the basic configuration of the FPOMDP is determined. That is to say, at the step S110, information on elements included in information spaces defined in the POMDP and Max-Fan-In are determined to be used in processing to construct an FPOMDP. As is obvious from the above description, Max-Fan-In, which is information on the configuration of the FPOMDP, is information on the state of connections of nodes included in the BN.

Then, at the next step S120, learning sample data ISO prepared in advance is used to carry out a learning process to generate BNs each corresponding to an intra-network. Subsequently, at the next step S130, the learning sample data 180 is used to carry out a learning process to generate a dynamic BN corresponding to an inter-network from the BNs generated in a process carried out at the step S120. The processing carried out at the steps S120 and S130 is processing to clarify associations of elements with each other by analyzing the relationships between the elements, which have been set in the process carried out at the step S110. That is to say, the processing carried out at the steps S120 and S130 is processing to clarify relationships between the elements by setting arrows in the FPOMDP configuration shown in FIG. 2.

To be more specific, the processing carried out at the step S120 is processing to clarify associations of elements with each other by analyzing the relationships between the elements set in an FPOMDP (Factored Partially Observable Markov Decision Process) of an event observation domain. In the case of the typical configuration shown in FIG. 2, the FPOMDP is in the event observation domain corresponding to the event observation time T=(t−1) or T=t. On the other hand, the processing carried out at the step S130 is processing to clarify associations of elements with each other by analyzing the relationships between the elements in FPOMDP spread over different event observation domains. The processing carried out at Steps 1 and 2 described earlier as steps of constructing an infra-network corresponds to the processing carried out at the step S120 of the flowchart shown in FIG. 11. On the other hand, the processing carried out at Step 3 described earlier as a step of constructing an inter-network corresponds to the processing carried out at the step S130 of the flowchart shown in FIG. 11.

That is to say, the step S120 is an intra-BN generation step of constructing a combined BN corresponding to an intra-network by creating a BN for each individual one of observation elements in the same event observation domain as a BN including the individual observation element and combining the BNs each created for an individual one of the observation elements as a BN including the individual observation element. As described earlier, the observation elements are included in the observation space defined in a POMDP (Partially Observable Markov Decision Process). On the other hand, the step S130 is a dynamic-BN generation step of constructing a DBN (dynamic BN) corresponding to an inter-network including relations between elements in different event observation domains by analyzing relationship's between elements included in a plurality of BNs each generated, in the process carried, out at the step S120 as a BN corresponding to one of intra-networks in the different event observation domains.

In the processing carried out an the step S120 to construct a combined BN corresponding to an infra-network and the processing carried out at the step S130 to construct a dynamic BN corresponding to an inter-network, a DAG (Directed Acyclic Graph) for each of the BNs is used as data showing relations between elements, and a process is carried out to update the DAGs on the basis of information obtained as a result of a learning process based on learning sample data 180 in order to complete the BNs. FIG. 12 shows a flowchart representing detailed processing carried out at a step S120 of the flowchart shown in FIG. 11 whereas FIG. 13 shows s flowchart, representing detailed processing carried out at a step S130 of the flowchart shown in FIG. 11.

Then, in a process carried out at the next step S140, the FPOMD like the one shown in FIG. 2 is completed on the basis of results of the processing carried out at the steps S120 and S130. That is to say, the FPOMD is constructed on the basis of the DBN. It is to be noted that, in this processing, elements with their connection relations set on the basis of the DBN generated in the processing carried, out at Step 3 are grouped into their space categories, which are the state space, the action space, the reward space and the observation space. In addition, typically, probability computation functions each representing a relation between elements are set. Typical probability computation functions are the state-transition probability computation function $T(s_{t+1}, a_t, s_t) = P(s_{t+1}|a_t, s_t)$ and the observation-generation probability computation function $O(s_{t+1}, a_t, o_t) = P(o_{t+1}|a_t, s_t)$, which have been described earlier. These probability computation functions are each set on the basis of concrete states of relations between information spaces, which are the state space, the action space, the reward space and the observation space as well as relations between elements included in the information spaces. That is to say, the probability computation functions are each set on the basis of CPTs (Conditional Probability Tables), which are each a table for collecting generation probabilities of elements each serving as a child node pointed to by an arrow originated from an element serving as a parent node.

By carrying out this processing, the FPOMDP like the one shown in FIG. 2 can be constructed. Then, the processing to predict a state transition and determine an action is carried out by applying the FPOMDP in order to allow processing to be executed to clearly differentiate probabilities from each other in element units and differentiate cause-effect relations between elements from each other. As a result, processing more suitable for realities can be carried out.

Next, details of the processing carried out at the step S120 are explained by referring to the flowchart shown in FIG. 12. As shown in the figure, the flowchart begins with a step S121 to produce a result of determination as to whether or not the model set in the process carried out at the step S110 is a model that can be created as a result of a learning process making use of the learning sample data 180. Stored in a storage unit, the learning sample data 180 is typically a database that can be used by the information-processing apparatus. The learning sample data 180 includes elements composing information spaces such as the state space, the action space and the observation space. The learning sample data 180 also includes dependence relations between some of the elements. Thus, to be more specific, the process of the step S121 is carried out to produce a result of determination as to whether or not information required to construct relations between elements set in the process carried out at the step S110 is included in the learning sample data 180. If the result of the determination indicates that the information required to construct relations between elements set in the process carried out at the step S110 is not included in the learning sample data 180, the learning process making use of the learning sample data 180 cannot be performed. In this case, execution of the processing represented by the flowchart shown in FIG. 12 is ended.

If the determination result produced in the process carried out at the step S121 indicates that the information required to construct relations between elements set in the process carried out at the step S110 is included in the learning sample data 180, on the other hand, the flow of the processing goes on to a step S122. A process is carried out at the step S122 to initialize a DAG (Directed Acyclic Graph) showing the existence/non-existence of arrows each representing a relation between nodes in a BN as explained earlier by referring to FIG. 10 by resetting the DAG. That is to say, at this point of time, a process is carried out to construct a DAG shown in FIG. 10B in its initialized state as a DAG for an intra-network.

The names of elements set in the process carried out at the step S110 are set in vertical and horizontal fields of the DAG. In the following description, the vertical and horizontal fields of the DAG are also referred to as parent and child fields respectively. In the process carried out at the step S122, the DAG, which indicates the presence or absence of an arrow, is initialized by resetting all values in the DAG to 0 (0: non-existence of an arrow). Thus, the process carried out at the step S122 is also referred to as a process to initialize the DAG.

Processes carried out at the next steps S123 to S125 are processing to construct an intra BN by carrying out a learning process making use of the learning sample data 180. This learning process corresponds to the processing explained earlier by referring to FIGS. 4 to 7. To be more specific, first of all, in the process carried out at the step S123, the observation-element data [i] of an observation element [nobs] is selected, where notation i denotes the ID of the observation element.

Then, at the step S124, a learning process making use of the learning sample data 180 is carried out in order to analyze relationships between any two elements each serving as a node of the BN and determine the existence/non-existence of each, arrow representing a relation between elements. If a combination of two nodes is detected as a combination of nodes, the relation of which is determined to exist, the existence of an arrow representing the relationship is confirmed and the DAG data is updated by setting an entry provided for the nodes in the DAG at 1 in a process carried out at the next step S125.

Then, the flow of the processing goes on to a step S126 to produce a result of determination as to whether or not the processing has been carried out on all observation elements. If the result of the determination indicates that the processing has not been carried out on all observation elements, the flow of the processing goes on to a step S127 at which the variable i serving as the ID of the observation element is incremented by 1. Then, the processes of the step S123 and the subsequent steps are repeated. As a matter of fact, the processes of the step S123 and the subsequent steps are carried out repeatedly till the result of the determination indicates that the processing has been carried out on ail observation elements. As the result of the determination indicates that the processing has been carried out on all observation elements, the flow of the processing goes on from the step S126 to the step S130. This is because a plurality of BNs have been completed for all the observation elements as individual infra-networks each including one of the observation elements as shown in FIGS. 4 and 5. In actuality, however, the data processing carried out at the step S123 and the subsequent steps is processing to set values of a DAG for each of the observation elements.

Details of the processing carried out at the step S130 are described by referring to the flowchart shown in FIG. 13 as follows. As shown in the figure, the flowchart begins with a step S131 at which DAGs each generated for one of the observation elements (i) in the processing carried out at the step S120 are combined in order to create a combined DAG for ail the observation elements (i). The process carried out at the step S131 corresponds to the processing to generate a combined BN as explained earlier by referring to FIGS. 6 and 7. It is to be noted that Max-Fan-In representing the maximum number of arrows each pointing to any observation element has been determined in advance in the process carried out at the step S110 as a piece of information on the basic configuration of the FPOMDP (Factored POMDP). Thus, a combined DAG is created for ail the observation elements under the restriction imposed by determined Max-Fan-In representing the maximum number of arrows each pointing to any observation element.

The combined DAG generated in the process carried out at the step S131 is a DAG like the one shown in FIG. 10B as a DAG for an intra-network. Then, in a process carried out at the next step S132, pieces of data of all elements pertaining to the S (state), the A (action) and the O (observation) for different event observation times are combined in order to set the configuration of a DBN corresponding to an inter-network like the one shown in FIG. 8. At this point of time, however, arrows each representing a relationship between elements in different event observation domains have not been set. That is to say, the arrows L1 to L8 each drawn as a solid line in the DBN shown in FIG. 8 have not been set.

Then, at the next step S133, a learning process making use of the learning sample data 180 is carried out to analyze relationships between elements in intra-networks for different event observation times in order to determine the basic configuration of an inter DAG like the one shown in FIG. 10A as a DAG for an intra-network, By carrying out the process of this step, the arrows L1 to L8 each drawn as a solid line in the DBN shown in FIG. 8 are set. Then, in a process carried out at the next step S134, an intra DAG and the inter DAG, which allow information on rewards to be found, are completed. If elements have been set in the reward space, the process of the step S134 is carried out as a process to set a reward for each of the elements pertaining to the reward space.

A result of the processing described so far is a DBN (Dynamic Bayesian Network) like the one shown in FIG. 8, which is a BN corresponding to an inter-network clarifying relations between information spaces in a plurality of event observation domains and relations between elements pertaining to the information spaces.

After the processing of the step S130 is ended, the process of the step S140 is carried out in order to complete the FPOMDP (Factored POMDP) corresponding to the DBN like the one shown in FIG. 9. In the process carried oat at the step S140, typically, probability computation functions each representing a relation between elements is set. Typical probability computation functions are the state-transition probability computation function T $(s_{t+1}, a_t, s_t) = P(s_{t+1}|a_t, s_t)$ and the observation-generation probability computation function O $(s_{t+1}, a_t, o_t) = P(o_{t+1}|a_t, s_t)$, which are described earlier. These probability computation functions are each set on the basis of concrete states of relations between information spaces, which are the state space, the action space, the reward space and the observation space as well as relations between elements included in the information spaces. That is to say, the probability computation functions are each set on the basis of CPTs (Conditional Probability Tables), which are each a table for collecting probabilities of generating elements each serving as a child node pointed to by an arrow originated from an element serving as a parent node.

By carrying out the processing represented by the flowchart shown in FIG. 11, for example, a FPOMDP (Factored POMDP) like the one shown in FIG. 2 can be constructed. Then, the processing to predict a state transition and determine an action is carried out by applying the FPOMDP in order to allow processing to be executed to clearly differentiate probabilities from each other in element units and differentiate cause-effect relations between elements from each other. As a result, processing more suitable for realities can be carried out.

By referring to FIG. 14, the following description explains a functional configuration of an information-processing apparatus 200 for carrying out processing to generate the FPOMDP (Factored POMDP) described above. FIG. 14 is a block diagram showing the functional configuration of the information-processing apparatus 200 for carrying out processing to generate the FPOMDP (Factored POMDP) described above. The information-processing apparatus 200 has the same configuration with a configuration of a general personal computer. It is to foe noted that a typical hardware configuration of the information-processing apparatus 200 will be described later. As shown in the figure, the functional configuration of the information-processing apparatus 200 employs a user interface 201, a data processing unit 202, a storage unit 203 and a database 204.

The user interface 201 is a unit for inputting a variety of inputs such as a command to start processing to generate an FPOMDP (Factored POMDP), configuration information such as information on an element serving as a node, information on a relation between nodes and information on a formula for computing a reward to mention a few. The data processing unit 202 is a unit for carrying out the processing to generate an FPOMDP as explained earlier by referring to the flowcharts shown in FIGS. 11 to 13. The storage unit 203 is a unit for storing a program to be executed by a CPU employed in the data processing unit 202 to carry out the processing to generate an FPOMDP. That is to say, the CPU executes the program to drive the data processing unit 202 to carry out the processing to generate an FPOMDP.

The database 204 is a database containing the learning sample data ISO used in the processing to generate an FPOMDP as explained earlier by referring to the flowcharts shown in FIGS. 11 to 13. The data processing unit 202 properly reads out the learning sample data 160 from the database 204 to be used in the processing to generate an FPOMDP. It is to be noted that a DAG for a BN generated in the processing to generate an FPOMDP is also stored in the storage unit 203 and updated from time to time if necessary.

The processing carried out by the data processing unit 202 is explained in concrete terms as follows. The data processing unit 202 takes the POMDP (Partially Observable Marcos Decision Process) as a basic configuration and analyses relations between elements for each of elements pertaining to every information space defined in the POMDP. Then, on the basis of a result of the analysis, the data processing unit 202 constructs an FPOMDP (Factored POMDP) including information on relations between the elements.

For example, on the basis of the learning sample data 180, the data processing unit 202 carries out a process to determine relationships between any individual element included in the observation space defined as an information space in the POMDP and an element included in at least one of information spaces defined in the POMDP as information spaces other than the observation space in order to construct a BN including the individual element. In the embodiment, the information spaces other than the observation space are the state space, the action space and the reward space. Such a BN is constructed for each individual one of elements pertaining to the observation space as a BN including the individual element. Then, the data processing unit 202 carries out a process to combine a plurality of such BNs constructed in the same event observation domain into a combined BN corresponding to an intra-network. Subsequently, the data processing unit 202 further carries out a process to analyze relationships between elements in a plurality of combined BNs each corresponding to one of the intra-networks in the different event observation domains in order to construct a DBN (Dynamic Bayesian Network) corresponding to an inter-network including information on relations between elements in different event observation domains. These processes are each a process carried out on the basis of the learning sample data 160 read out from the database 204.

That is to say, the data processing unit 202 carries out processes of applying a DAG (Directed Acyclic Graph) for elements in the BN and updating the DAG on the basis of information obtained as a result of execution of a learning process based on the learning sample data 180 in order to analyze relations between elements in processing to construct an FPOMDP. It is to be noted that, prior to these processes, the data processing unit 202 inputs element information including types of elements included in information spaces defined in the POMDP as well as Max-Fan-In representing the maximum number of arrows each pointing to an element for each element and constructs a FPOMDP in accordance with these pieces of aforementioned input information. Used as information on the configuration of the FPOMDP, Max-Fan-In shows the state of connections of nodes in a BN.

Finally, by referring to FIG. 15, the following description explains a typical hardware configuration of the information-processing apparatus for carrying out the processes described above. Used for executing an OS (Operating System), a CPU (Central Processing Unit) 501 included in the hardware configuration functions as the core component employed in the data processing unit 202 according to the embodiment described above. To put it concretely, the CPU 501 is a unit for carrying out the processing to construct an FPOMDP by generation of a DBN by making use of the learning sample data 130. The CPU 501 carries out this processing by execution of a computer program stored in a ROM (Read Only Memory) 502 employed in the data processing unit 202 or a data storage unit such as an HDD (Hard Disk Drive) 511 also employed in the data processing unit 202.

The ROM 502 is a storage unit used for storing the aforementioned computer program in advance as a program to be executed by the CPU 501 as described above. The computer program is a program to be executed to carry out the processing to generate an FPOMDP. In addition, the ROM 502 is used for storing data such as processing constant parameters required in the execution of the computer program. The RAM 503 is used for storing data such as processing variables required in the execution of the computer program. The CPU 501, the ROM 502 and the RAM 503 are connected to each other by making use of a host bus 504 such as a CPU bus, which is also connected to a bridge 505.

The host bus 504 is connected to an external bus 506 such as a PCI (Peripheral Component Interconnect/Interface) through the bridge 505. The external bus 506 is connected to an Interface 507, which is linked to a keyboard 508, a pointing device 509, a display unit 510, the aforementioned HDD (Hard Disk Drive) 511, a drive 512, a connection port 514 and a communication unit 515.

The keyboard 508 and the pointing device 509 are each an input device to be operated by the user. The display unit 510 typically employs a liquid-crystal display unit or a CRT (Cathode Ray Tube).

The HDD 511 employs a hard disk embedded therein as a storage unit and drives the hard disk for storing a variety of computer programs to be executed by the CPU 501 and data. A computer program is read out from the hard disk and loaded into the RAM 503 for execution by the CPU 501. The data can also foe read out from the hard disk and loaded into the RAM 503 in execution of the computer program. The data stored in the hard disk includes the learning sample data 180 and DAG information for the configuration of each BN. The computer programs include a data processing program.

The drive 512 is a unit for reading out a program or data from a removable recording medium 512 mounted thereon and supplying the program or the data to the RAM 503 by way of components such as the interface 507, the external bus 506, the bridge 505 and the host bus 504. Examples of the removable recording medium 512 are a magnetic disk, an optical disk, a magneto-optical disk and a semiconductor memory.

The connection port 514 is a port connected to an external apparatus 522. The connection port 514 employs connection units such as a USB and an IEEE1394 connection unit. The connection port 514 is connected to the CPU 501, the ROM 502 and the RAM 503 through components such as the interface 507, the external bus 506, the bridge 505 and the host bus 504. The communication unit 515 is connected to a network. It is possible to provide the information-processing apparatus 200 with a configuration in which the learning sample data 180 is acquired from a data source, which is connected to the network, by way of the communication unit 515.

The typical hardware configuration shown in FIG. 15 as the configuration of the information-processing apparatus 200 is designed as the configuration of a PC (Personal Computer). It is to be noted, however, that the configuration of the information-processing apparatus 200 is by no means limited to the configuration shown in FIG. 15. That is to say, any configuration can be designed for the information-processing apparatus 200 as long as the configuration is capable of carrying out the processing according to the embodiment described above.

The present invention has been exemplified so far in detail by describing a specific embodiment. It is obvious, however, that a person skilled in the art is capable of changing the embodiment and providing a substitute for the embodiment as long as the changes and/or the substitute are within the range not deviating from essentials of the present invention. In other words, the present invention has been explained by describing an embodiment as an example. However, the contents of the specification should not be interpreted as limitations imposed on the present invention. In order to determine essentials of the present invention, the reader is suggested to refer only to claims appended to the specification.

The series of processes described in this specification can be carried out by hardware, execution of software or a combination of hardware and execution of software. If the series of processes described above is carried out by execution of software, programs composing the software can be installed into a computer embedded in dedicated hardware, a general-purpose personal computer or the like from typically a network or the recording medium. In this case, the computer or the personal computer functions as the information-processing apparatus 200 described above. A general-purpose personal computer is a personal computer, which can be made capable of carrying out a variety of functions by installing a variety of programs into the personal computer.

The aforementioned recording medium for recording programs to be installed into a computer or a general-purpose personal computer as programs to be executed by the computer or the general-purpose personal computer respectively is the removable recording medium 521 provided to the user separately from the main unit of the information-processing apparatus 200 as shown in FIG. 15. Examples of the removable recording mediums also each referred to as a package medium include the magnetic disk such as a flexible disk, the optical disk such as a CD-ROM (Compact Disk-Read Only Memory) or a DVD (Digital Versatile Disk), the magneto-optical disk such as an MD (Mini Disk) as well as the semiconductor memory. Instead of installing the programs from the removable recording mediums, the programs can also be stored in advance in an embedded recording medium included in the main unit of the information-processing apparatus 200. Examples of the embedded recording medium are the hard disk included in the HDD 511 and the ROM 502.

As described above, the programs composing the software can be installed into a computer embedded in dedicated hardware, a general-purpose personal computer or the like from typically a network, which can be a LAN (Local Area Network) or the Internet. In this case, the programs are downloaded from a download site through wire communication by way of the network or through radio communication to the computer embedded in dedicated hardware, the general-purpose personal computer or the like. The programs are then installed into an embedded recording medium employed in the computer, the general-purpose personal, computer or the like. An example of the embedded recording medium is the hard disk employed in the ROD 511.

It is also worth noting that, in this specification, steps of the flowchart described above can be carried out not only in a pre-prescribed order along the time axis, but also concurrently or individually. It is also to be noted that the technical term 'system' used in this specification implies the configuration of a confluence including a plurality of apparatus, which do not have to be physically accommodated in the same cabinet.

As described above, in accordance with an embodiment of the present invention, a POMDP (Partially Observable Markov Decision Process) is taken as a basic configuration and, for each of a state space, an action space, a reward space and an observation space, which are each defined in the POMDP as an information space, a plurality of different elements (or factors) are set in order to make it possible to automatically construct an FPOMDP (Factored POMDP) clarifying relations between the elements. In state-transition prediction and action-determination processing applying the FPOMDP generated by carrying out a process in accordance with the present invention as a process clarifying a dependence relation set for each element as a relation between two elements, it is possible to perform a process to clearly differentiate a cause-effect relation set for each element as a cause-effect relation between two elements from any other cause-effect relation. Thus, it is possible to carry out processing to predict a state transition more correctly and processing to determine an action more effectively. The FPOMDP constructed in accordance with the present invention can be applied to various kinds of action determination processing such as processing to determine an action to foe taken by a robot, a simulation making use of a computer, data processing and processing to determine an optimum action in business management.

What is claimed is:

1. An information-processing apparatus for constructing an information analysis processing configuration to be applied to information analysis processing in an observation domain including an uncertainty, said information-processing apparatus comprising
a data processing unit configured to, based on a Partially Observable Markov Decision Process having information spaces including at least an observation space:
construct a Bayesian Network for each observation element included in the observation space;
combine said Bayesian Networks to create a Synthesized Bayesian Network including all of the observation elements included in the observation space; and
construct a Factored Partially Observable Markov Decision Process, which is a Partially Observable Markov Decision Process including relations between elements of the information spaces, based on the Synthesized Bayesian Network.

2. The information-processing apparatus according to claim 1, wherein:
said information spaces include a state space, an action space, a reward space and the observation space; and
the Bayesian Network for each observation element is constructed by determining relationships between the observation element and elements included in at least one of said information spaces other than said observation space.

3. The information-processing apparatus according to claim 1, wherein:
said information spaces are first information spaces of a first event observation domain;
the Synthesized Bayesian Network is a first Synthesized Bayesian Network;
the Partially Observable Markov Decision Process also has second information spaces of a second event observation domain;
the second information spaces include at least an observation space; and
the data processing unit is configured to:
construct a Bayesian Network for each observation element included in the observation space of the second information spaces;
combine said Bayesian Networks constructed for the observation elements included in the observation space of the second information spaces to create a second Synthesized Bayesian Network including all of the observation elements included in the observation space of the second information spaces; and
analyze relationships between elements in the first and second Synthesized Bayesian Networks to construct a Dynamic Bayesian Network including information on relations between elements in said first and second event observation domains.

4. The information-processing apparatus according to claim 3, wherein the analysis of the relationships is based on learning sample data.

5. The information-processing apparatus according to claim 1, wherein the Factored Partially Observable Markov Decision Process is constructed by:
applying a Directed Acyclic Graph (DAG) to each Bayesian Network; and
updating said DAG based on learning sample data.

6. The information-processing apparatus according to claim 1, wherein said data processing unit is configured to:
input element information including the types of elements included in the information spaces as well as Max-Fan-In used as information on the configuration of said Factored Partially Observable Markov Decision Process to show the state of connections of nodes in each Bayesian Network; and
construct the Factored Partially Observable Markov Decision Process in accordance with pieces of said input information.

7. An information processing method for constructing an information analysis processing configuration to be applied to information analysis processing in an observation domain including an uncertainty, said information processing method comprising the steps of:
generating, with a data processing unit, an intra Bayesian Network for each observation element included in an observation space of a Partially Observable Markov Decision Process;
combining, with the data processing unit, a plurality of Bayesian Networks, each generated for one observation element included in said observation space, all of the plurality of as Bayesian Networks having the same event observation domain, in order to construct a combined Bayesian Network;
generating, with the data processing unit, a Dynamic Bayesian Network by analyzing relationships between elements in a plurality of combined Bayesian Networks, each of the combined Bayesian Networks corresponding to a different event observation domain, in order to construct a Dynamic Bayesian Network including information on relations between elements in said different event observation domains; and
generating, based on the Dynamic Bayesian Network and with the data processing unit, a Factored Partially Observable Markov Decision Process including information on relations between elements pertaining to information spaces of said Partially Observable Markov Decision Process, the information spaces including at least the observation space.

8. The information processing method according to claim 7, wherein:
said information spaces include a state space, an action space, a reward space and said observation space; and
the intra Bayesian Network is generated by determining relationships between the observation element and an element included in at least one of said information spaces other than said observation space based on learning sample data.

9. The information processing method according to claim 7, wherein, at said step of generating the Dynamic Bayesian Network, the analysis of the relationships is based on learning sample data.

10. The information processing method according to claim 7, wherein the Factored Partially Observable Markov Decision Process is generated by:
applying a DAG (Directed Acyclic Graph) to each Bayesian Network; and
updating said DAG based on learning sample data.

11. The information processing method according to claim 7, further including:
inputting element information including the types of elements included in the information spaces as well as Max-Fan-In used as information on the configuration of said Factored Partially Observable Markov Decision Process to show the state of connections of nodes in each Bayesian Network; and
constructing the Factored Partially Observable Markov Decision Process in accordance with pieces of said input information.

12. A non-transitory, computer-readable storage medium storing a computer program that, when executed by an information-processing apparatus, causes the information-processing apparatus to perform a method for constructing an information analysis processing configuration to be applied to information analysis processing in an observation domain including an uncertainty, the method comprising:
generating an intra Bayesian Network for each observation element included in an observation space of a Partially Observable Markov Decision Process;
combining a plurality of Bayesian Networks, each generated for one observation element included in said observation space, all of the plurality of Bayesian Networks having the same event observation domain, in order to construct a combined Bayesian Network;
generating a Dynamic Bayesian Network by analyzing relationships between elements in a plurality of combined Bayesian Networks, each of the combined Bayesian Networks corresponding to a different event observation domain, in order to construct a Dynamic Bayesian Network including information on relations between elements in said different event observation domains; and
generating, based on the Dynamic Bayesian Network, a Factored Partially Observable Markov Decision Process including information on relations between elements pertaining to information spaces of said Partially Observable Markov Decision Process, the information spaces including at least the observation space.

* * * * *